(12) United States Patent
Gallagher et al.

(10) Patent No.: US 10,416,341 B2
(45) Date of Patent: Sep. 17, 2019

(54) INTEGRATION OF INSPECTION SCANNERS TO CARGO CONTAINER PROCESSING SYSTEM FOR EFFICIENT PROCESSING AND SCANNING OF CARGO CONTAINERS AT A PORT

(71) Applicant: Decision Sciences International Corporation, Poway, CA (US)

(72) Inventors: Brian Gallagher, Hamilton, VA (US); Michael James Sossong, Ramona, CA (US); Mark Saltus, San Diego, CA (US); Robert Whalen, La Jolla, CA (US)

(73) Assignee: Decision Sciences International Corporation, Poway, CA (US)

( * ) Notice: Subject to any disclaimer, the term of this patent is extended or adjusted under 35 U.S.C. 154(b) by 0 days.

(21) Appl. No.: 15/621,980

(22) Filed: Jun. 13, 2017

(65) Prior Publication Data

US 2017/0357026 A1  Dec. 14, 2017

Related U.S. Application Data

(60) Provisional application No. 62/349,647, filed on Jun. 13, 2016.

(51) Int. Cl.
*G01V 5/00* (2006.01)
*B65G 67/60* (2006.01)
(Continued)

(52) U.S. Cl.
CPC ......... *G01V 5/0016* (2013.01); *B65G 67/603* (2013.01); *G01T 1/169* (2013.01);
(Continued)

(58) Field of Classification Search
CPC .... G01V 5/0016; G01V 5/0091; G06Q 10/08; G06Q 50/28; B65G 67/603; G01T 1/169
See application file for complete search history.

(56) References Cited

U.S. PATENT DOCUMENTS 3,332,662 A   7/1967  Fagan et al.
4,425,069 A   1/1984  Saur et al.
(Continued)

FOREIGN PATENT DOCUMENTS

WO   2012/167381 A1   12/2012

OTHER PUBLICATIONS

Boske, L.B., et al., "Port and Supply-Chain Security Initiatives in the United States and Abroad," Lyndon B. Johnson School of Public Affairs, The University of Texas at Austin, Policy Research Project Report, No. 150, pp. 1-237, Feb. 2006.
(Continued)

*Primary Examiner* — David E Smith
(74) *Attorney, Agent, or Firm* — Perkins Coie LLP

(57) ABSTRACT

Methods and systems are disclosed for the deployment and operation of shipping container scanning systems that enables scanning of containers passing through a modern, highly automated port without impeding the flow of commerce. Locating the scanners where container dwell time is already longest, and configuring scanners to scan up to several containers in parallel but under separate scanning control, minimizes any delay associated with scanning. Operationally integrating scanning systems with the automated logistical port systems ensures smooth, delay-free operation. Controlling the flow of information so that scanning results, including but not limited to images and assessments of the presence or absence of threat material or contraband, are sent only to government Customs and/or security facilities adjacent to but separate from the port
(Continued)

insulates port operators from involvement in activities that could slow container throughput.

46 Claims, 23 Drawing Sheets

(51) Int. Cl.
    *G01T 1/169*     (2006.01)
    *G06Q 50/28*     (2012.01)
    *G06Q 10/08*     (2012.01)
    *B65D 88/12*     (2006.01)

(52) U.S. Cl.
    CPC ............ *G01V 5/0091* (2013.01); *G06Q 10/08* (2013.01); *G06Q 50/28* (2013.01); *B65D 88/12* (2013.01)

(56) References Cited

U.S. PATENT DOCUMENTS

| | | | |
|---|---|---|---|
| 5,638,420 A | 6/1997 | Armistead | |
| 6,370,222 B1 * | 4/2002 | Cornick, Jr. | G01V 5/0016 378/57 |
| 7,106,244 B2 * | 9/2006 | Hsu | G01S 7/41 342/175 |
| 7,633,062 B2 | 12/2009 | Morris et al. | |
| 8,247,767 B2 | 8/2012 | Morris et al. | |
| 8,288,721 B2 * | 10/2012 | Morris | G01T 1/18 250/251 |
| 8,536,527 B2 * | 9/2013 | Morris | G01N 23/046 250/306 |
| 9,177,462 B1 * | 11/2015 | Meyers | G08B 23/00 |
| 2005/0011849 A1 * | 1/2005 | Chattey | B66C 19/002 212/270 |
| 2008/0118026 A1 | 5/2008 | Ainsworth et al. | |
| 2009/0148818 A1 * | 6/2009 | Li | G09B 19/0092 434/127 |
| 2009/0184818 A1 * | 7/2009 | Murphy | G06Q 10/08 340/540 |
| 2011/0027059 A1 * | 2/2011 | Benedict | B65G 63/004 414/803 |
| 2011/0231158 A1 * | 9/2011 | Carpenter | G01V 5/0083 702/188 |
| 2011/0248163 A1 | 10/2011 | Morris et al. | |
| 2013/0101172 A1 * | 4/2013 | Parikh | G06T 7/0004 382/104 |
| 2013/0156156 A1 | 6/2013 | Roe et al. | |
| 2014/0211916 A1 | 7/2014 | Morton | |
| 2015/0212014 A1 * | 7/2015 | Sossong | G01V 5/0016 250/394 |
| 2016/0041297 A1 | 2/2016 | Blanpied et al. | |
| 2016/0116630 A1 | 4/2016 | Sossong | |

OTHER PUBLICATIONS

International Search Report and Written Opinion dated Nov. 3, 2017 for International Application No. PCT/US2017/037344, filed on Jun. 13, 2017 (11 pages).

\* cited by examiner

| MATERIAL | dE/dx | $\chi$ |
|---|---|---|
| | MeV-cm²/gm | cm |
| $H_2O$ | 2.06 | 36 |
| Fe | 1.87 | 1.76 |
| Pb | 1.54 | 0.56 |

FIG. 8

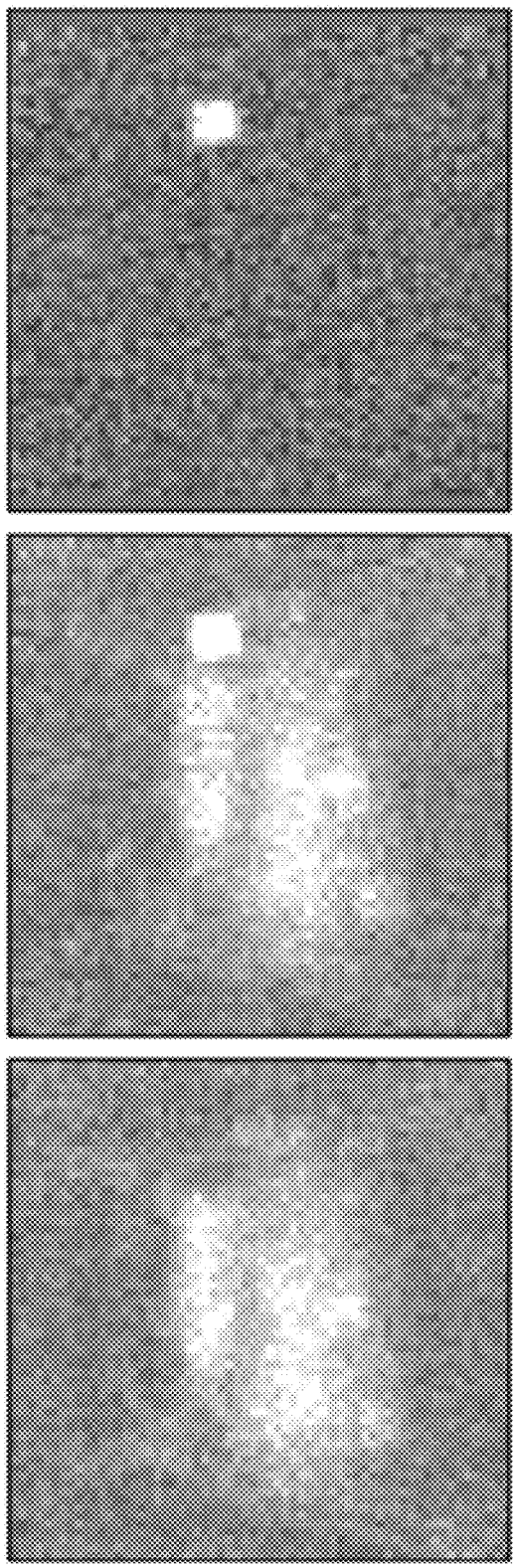

INTEGRATION OF INSPECTION SCANNERS TO CARGO CONTAINER PROCESSING SYSTEM FOR EFFICIENT PROCESSING AND SCANNING OF CARGO CONTAINERS AT A PORT

CROSS REFERENCE TO RELATED APPLICATIONS

This patent document claims the benefits and priority of U.S. Provisional Patent Application No. 62/349,647, filed on Jun. 13, 2016. The entire content of the before-mentioned patent application is incorporated by reference as part of the disclosure of this application.

TECHNICAL FIELD

This patent document relates to inspection of objects, cargos, vehicles, containers and others for security and portal monitoring or other applications.

BACKGROUND

Shipping via container cargos by vessels or ships constitutes a significant portion of flow of goods for commerce and other purposes. Container terminals at ports provide an interface between ships and ground transportation of the containers and it is essential to handle the inbound and outbound containers at a port efficiently and swiftly. Modern container terminals use various machines and vehicles for handling containers in connection with container terminal operations or processes, including, e.g., ship operations for offloading containers from a ship or uploading containers onto a ship, ship yard operations involving the storage or retrieval of containers in the yard, and hinterland operations involving handling and managing containers associated with ground transportations such as trucks or trains and other operations.

Inspection of inbound containers at a port is a critical process for safety and security and for compliance with governmental regulations in shipping of goods. Such inspection, however, may cause undesired delays in handling inbound containers for distribution by ground transportation.

SUMMARY

This patent document discloses a technology in connection with systems, devices and methods for integrating a container scanning mechanism as part of the handling process for processing containers in the yard stacks prior to turning the containers over to distribution by ground transportation.

The scanning systems deployed can be implemented in various configurations to minimize system and system installation costs while enabling unimpeded container throughput through the port, from unloading off a ship to exit on a truck or train through the port's main gate. Large ports, such as Singapore, Rotterdam or Norfolk, handle millions of containers per year (Rotterdam handles 3.3 million Twenty-foot Equivalent Units, TEU, annually), representing an average transit rate of several containers per minute—and a far higher rate at peak times. They may require several systems capable of scanning multiple containers simultaneously. Smaller ports may need fewer systems, or smaller ones, to keep up with the traffic flow.

The deployment method based on the disclosed technology places the scanning systems at the point where, after automated ship cranes have offloaded the container from the vessel and deposited it on an automated guided vehicle (AGV), the AGV deposits it to be taken up by automated yard cranes for stacking in yard stacks, awaiting pickup by trucks or trains. The transit times of yard cranes from pickup to stacking to return for the next pickup is generally between one and a few minutes, which accommodates typical scan times of the scanning systems.

In implementing the disclosed technology, a container terminal can be configured for performing container scanning as part of processing inbound containers from a ship at a port and includes a docking area including ship cranes operable to off load containers from a ship; and a stacking yard including yard stacks in designated stacking locations. Each yard stack includes a first end closest to the ship and at least one yard crane for receiving containers from the ship, at least one yard crane for handling containers that are dropped off at the first end and a second end farthest from the ship for sending containers for ground transportation. The container terminal includes container scanners distributed to the yard stacks. Each container scanner is located at the first end of each yard stack closest to the ship, each container scanner is configured to scan each container dropped off at the yard stack prior to placing scanned containers in another portion of the yard stack for ground shipping, and each container scanner is configured to obtain information on the scanned container indicating whether the container contains one or more suspect regions or objects. In this container terminal, a signal processing unit is communicably coupled to container scanners. The signal processing unit includes a memory configured to store data and instructions, and at least one processor, wherein the instructions, when executed cause the at least one processor to provide information for each scanned container for clearance for ground shipping, wherein the provided information includes an identification number, the container manifest, and information of the scanning indicating whether the scanned container contains one or more suspect regions or objects.

In implementing the disclosed technology, a method can be used for scanning containers as part of processing inbound containers from a ship in a container terminal of a port. This method can include off-loading containers from a ship onto one end of a yard stack closest to the ship; obtaining information on each container including container identification number and container manifest; prior to placing a container in the yard stack for ground shipping, operating a container scanner at the one end of the yard stack closest to the ship to scan the container to obtain information on the scanned container to indicate whether the container contains one or more suspect regions or objects; upon finishing the scanning, placing the scanned container in the yard stack for storage for subsequent ground shipping or onto a truck or train for immediate ground shipping; and providing information of the scanned container for clearance for ground shipping. The provided information includes the container identification number, the container manifest, and information of the scanning indicating whether the scanned container contains one or more suspect regions or objects.

In implementing the disclosed technology, a method can be used to enable scanning of shipping containers transiting a port for threat material or contraband material without slowing down the flow of containers through the port, from ship to exit by land or onto a ship in the case of transshipment This method can include, for example, shuttling a container arriving on an automated guided vehicle (AGV) from a ship into at least one scanning system, wherein the at least one scanning system is located at an end of a yard stack of containers nearest a dock; receiving a container identification and, if available, a container manifest; scanning the container to analyze the container's contents for the presence of threat material or contraband material; sending an integrated data package to an offsite customs or security facility, and shuttling the container out of the scanning system for pickup by a yard crane. The integrated data package includes: (a) the container identification, (b) the container manifest, (c) raw data related to the contents of the container or processed images of the contents of the container; (d) assessment of the contents of the container in terms of a presence of potential threat material or contraband materials, or (e) a clear signal or alert signal upon which customs or security can act.

The above features and their implementations are described in detail in the drawings, the description and the claims.

BRIEF DESCRIPTION OF THE DRAWINGS

FIG. 8 depicts a table showing theoretical energy loss rate (dE/dx) and radiation length (X) for various material.

FIGS. 14A, 14B, 15A, 15B, 16A-16C, 17 and 18 illustrate additional examples of muon tomography techniques based on prior knowledge and subtraction of a known reference background image.

DETAILED DESCRIPTION

The disclosed technology can be used to integrate container scanning systems or modules and the flow of resulting information into an existing, automated, container port in a manner that enables scanning of containers transiting the port without slowing the container throughput, and hence, the flow of commerce. In implementations, such integration can be configured to place the container scanning systems in the container processing process with small or minimal modifications to the existing port infrastructure and at a reasonably low cost.

Figure 1:
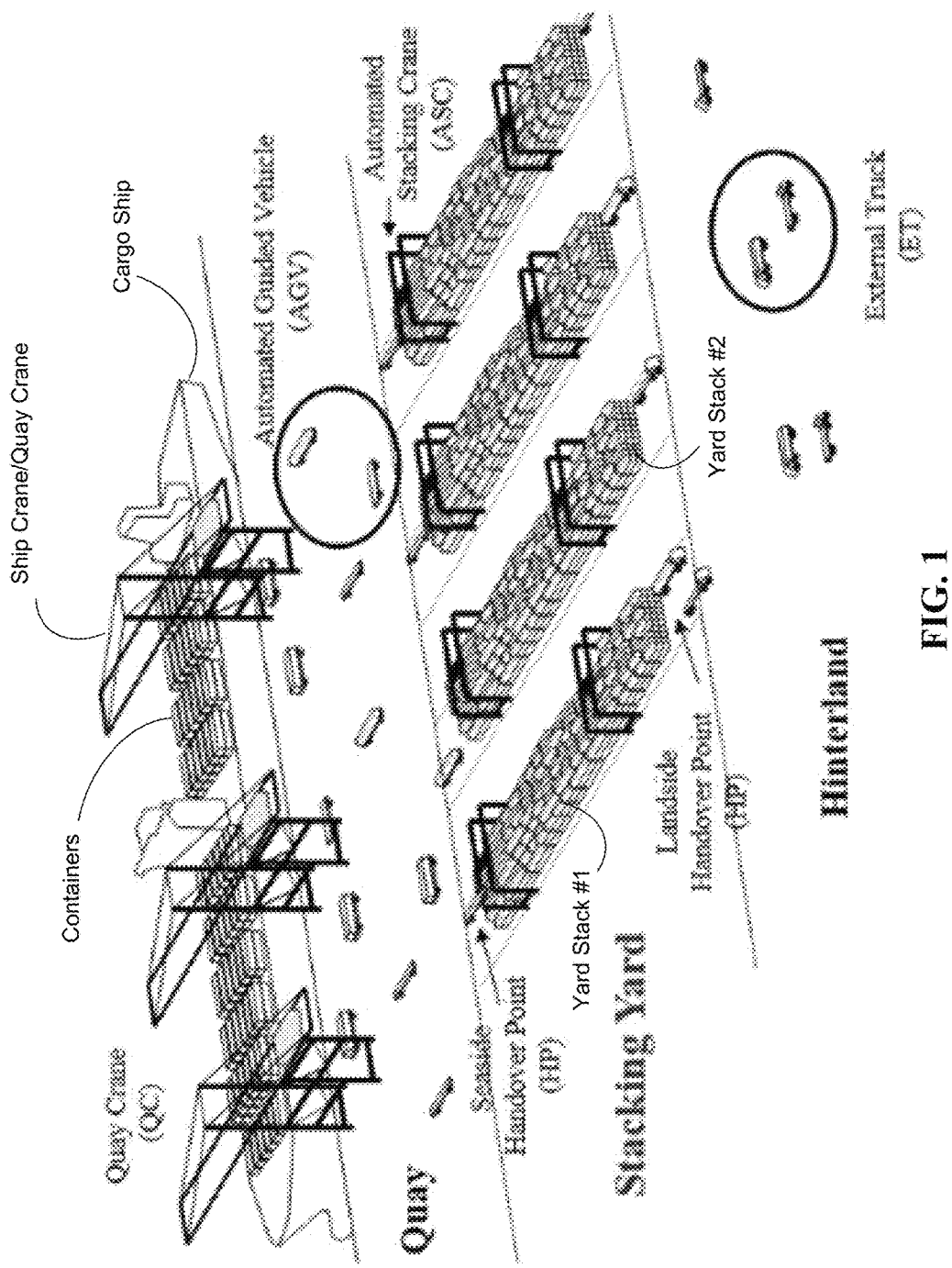
FIG. 1 shows an example of the general layout of a container terminal in a modern port.

FIG. 1 shows an example of the general layout of a container terminal in a modern port that includes, among others, (1) a quay area for handling ship operations for offloading containers from a ship or uploading containers onto a ship, (2) a stacking yard for various operations involving the storage or retrieval of containers, and (3) a hinterland area for carrying out hinterland operations involving handling and managing containers associated with ground transportations such as trucks or trains and other operations The example container terminal in FIG. 1 can be designed as an automated container shipping port. A vessel or cargo ship at the dock carries inbound containers to be off loaded and distributed at the port. Automated ship cranes or quay cranes are used to lift the containers off the ship. A container identification (ID) system can be used to read a container ID number from each container. For example, an optical reader can be used to automatically read a container's ID and this ID is used to tag the container throughout its transit through the port. To transport containers off loaded from the cargo ship in the quay area to the stacking yard for further processing, various automated vehicles may be used to move the containers to desired locations in the stacking yard where areas are designated as yard stacks for holding containers for further processing. Examples of such vehicles include yard trucks (YTs), straddle carriers (SCs), or automated guided vehicles (AGVs). An AGV is an automated vehicle and is guided by using suitable navigation mechanisms to move around in the quay area and the stacking yard. In operation, an AGV can position itself below the ship crane to receive a container from the ship crane and to deliver it to a desired location in a particular yard stack. As shown in FIG. 1, the stacking yard is designed for holding or storing the containers that are stacked in rows to be further processed. Each container row is at a designated location and is equipped with one or more yard cranes each operable to move along a container row to pick up or drop off a container at a specified location in that row. Information on container IDs and other container information, and information on locations of the container rows and positions in each row are used as part of the automation of the container terminal so that the ship cranes, AGVs and yard cranes can operate autonomously. Once an AGV receives a container from a ship crane, it transports the container to a yard crane for a selected row based on the container information. The yard crane in turn removes the container from the AGV and deposits it in the row. The containers in each row are laid end to end and stacked. Once a road truck is assigned to pick up a container for transport, a yard crane on the yard stack picks up the container and loads it onto the truck, which then proceeds to the port's exit gate. The entire operation is controlled by one or more computers, with minimal on-site human presence, except for the drivers of the trucks.

Standard container sizes are 8 feet wide by 8 or 9.5 feet tall and either 20 or 40 feet long. In some ports, depending the container flow capacity, each yard stack may be formed by between 5 and 10 parallel rows; rows may stacked up, e.g., to 4 or 5 containers high. In some cases, each row of the stack may contain approximately 25 to 50 containers, so that each yard stack can hold containers from several hundred to perhaps two thousand TEU.

Typically, each AVG handles a single container at a time and similarly each yard crane handles a single container at a time. Each row in the stack has quay end closest to the dock where an AGV drops off a container to be paced in that row by a yard crane. AGVs travel between ship cranes and yard cranes to transport containers. When a yard crane receives a container from an AGV to be placed in the stack, the yard crane lifts the container, travels to an automatically specified location along the yard stack, and deposits the container in an automatically specified row. Next, the yard crane returns to the pickup end of the stack (the end closest to the dock) for the next container.

The containers in the stack can be further processed to be shipped out via ground transportations such as trucks or trains. A yard crane can be operated to pick up a container in a row that is identified to be shipped out by a truck and to place it at the handover point for ground transportation. For example, a truck can receive the container at the handover point of the row and then goes to the inspection station and the exit gate of the container terminal.

The above container handling process is for inbound containers from a ship. Handing of the outbound containers to be shipped out by ships follow similar steps in the reverse order: containers from the ground are dropped off at the handover points of the rows in the stack and yard cranes place them at designated positions in the stack; next the yard cranes pick up containers to be shipped and hand them over to AGVs which transport them to respective ship cranes to be up loaded onto the ship.

Inbound containers at a port of entry of a country are subject to inspection by the proper authority in the receiving jurisdiction. For example, the U.S. Customs and Border Protection (CBP) requires all inbound containers to U.S. to be inspected while the outbound containers are inspected on a selected basis, e.g., certain high-risk containers. In most container terminals, container inspection requires an inspection scanning station that is placed in a designated inspection location separate from the rows of the stack. Such an inspection scanning station uses one or more scanning mechanisms, e.g., a X-ray scanner, to scan a truck carrying a container to determine whether it can be cleared for ground shipping. Under this arrangement, the inspection process is an additional process to the inbound container processing at the quay area and the stacking yard and thus adds additional delays in getting containers out of the container terminal.

The disclosed technology can be used to both physically integrate container scanning systems or modules into the existing yard stack infrastructure and operationally integrate the container scanning inspection into the yard crane operation run time without requiring an additional time for routine container scanning and without slowing the container throughput. Notably, AGVs and yard cranes tend to be operated to move slowly for safety. In some terminals, the average yard crane round trip time may be typically about four minutes, which is longer than the average round trip time for AGVs. Because the yard crane handles one container at a time, but may receive as many AGVs as there are rows in the yard stack, the yard crane's operation may be the rate-limiting step in container transit through the port. The disclosed technology utilizes the yard crane operation run time between loading two subsequent inbound containers from AGVs to perform the container scanning inspection inside the yard stack to provide efficient container inspection scanning.

Figure 2:
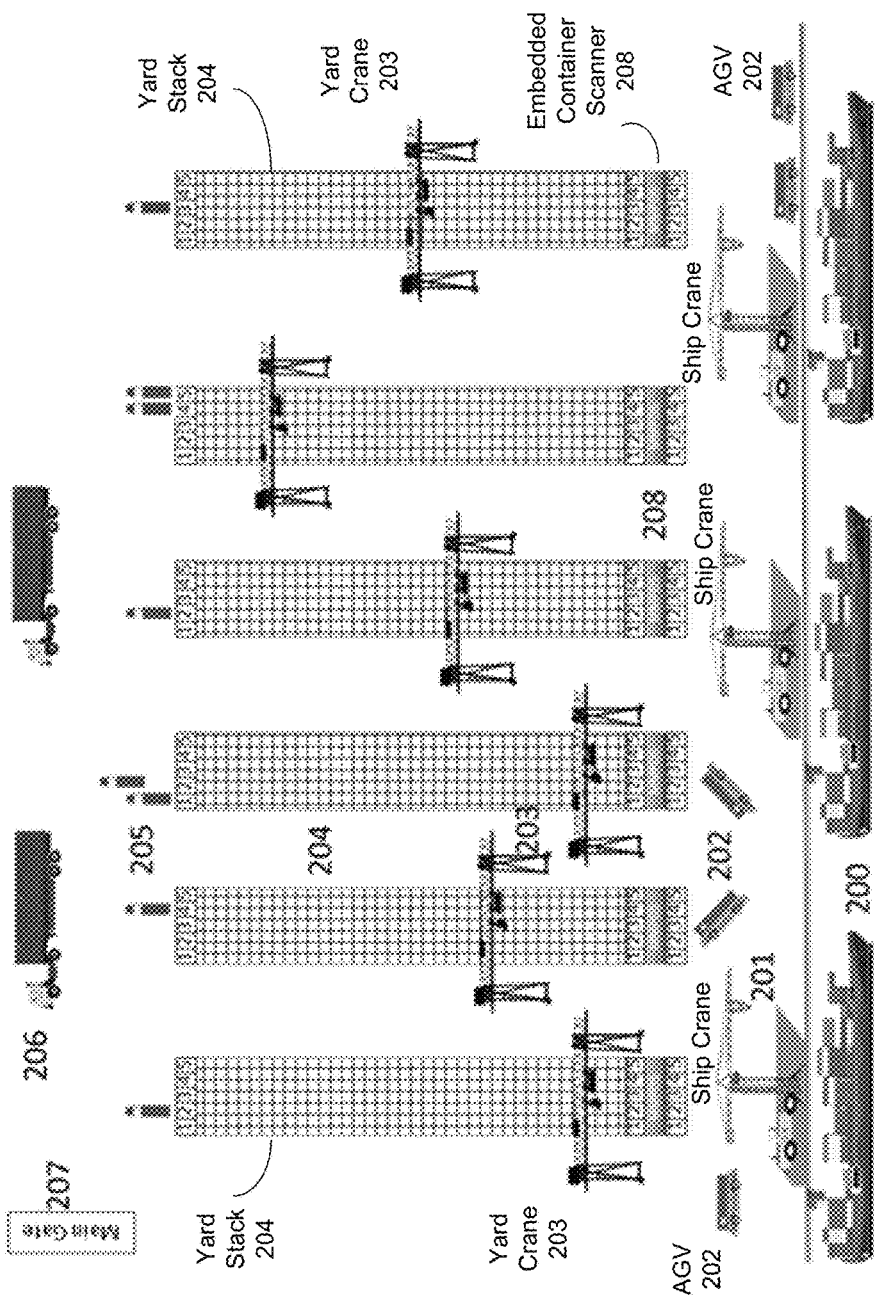
FIG. 2 schematically shows an example of a container port terminal equipped with scanning systems deployed to scan every container without impeding traffic flow based on the disclosed technology.

FIG. 2 schematically shows an example of a container terminal in a port equipped with scanning systems deployed to scan every container without impeding traffic flow based on the disclosed technology. FIG. 2 illustrates the layout the container terminal showing one or more vessels 200 and ship cranes 201 in the quay area, the AGVs 202, yard cranes 203 and yard stacks 204 in the stacking year area, and trucks 205 receiving containers for ground transportation of the inbound containers to their destinations based on the general layout of the container terminal in FIG. 1. In the specific example in FIG. 2, container scanners 208 (labeled as "MMPDS") are embedded as part of the yard stacks to provide container scanning during the routine processing of containers without needing one or more separate container scanning stations for inspection and without adding additional processing time designated for container scanning inspection. Each container scanner 208 is located on the end of the yard stack on the end closest to the quay area. In the illustrated example, each yard stack include five columns containers labeled as 1 through 5. One or more container scanners 208 can be integrated into the yard stack. At the minimum, at least one container scanner 208 be placed at the quay-end of the yard stack to perform container scanning during the run time of the yard crane 203. All containers are first dropped off at the quay-ends of the yard stacks and are scanned by the one or more container scanners 208 in each yard stack before they are picked up by the yard crane 203 to be placed in the yard stack or to be loaded on a truck 205. Trucks, carrying their containers that have been scanned, are indicated by 206 when such trucks line up at the main exit gate 207 of the port.

In some implementations, each container scanner 208 can include a container shuttle mechanism to take a container from an AGV 202, slide it into the container scanner 208, and then slide it out the other end of the container scanner 208 for pickup by a yard crane 203. This is done because, under the current designs of AGVs, an AGV, with a heavy tare weight (e.g., 26 metric tons), contains so much dense metal that its presence inside the container scanner 208 would increase the average scan time significantly, while also taking the AGV out of circulation for that time. Several manufacturers of AGVs also manufacture container shuttle systems that can be adapted for the use taught here.

The container scanner 208 can be configured to best meet the operational and cost requirements of specific ports. One or more container scanners 208 can be integrated into each yard stack. For example, each column within a yard stack can have its own container scanner 208 so that there may be 5 scanners in each yard stack having 5 columns as shown in FIG. 2. For another example, two or more columns in each yard stack may share one container scanner 208. At the minimum, at least one container scanner 208 be placed at the quay-end of the yard stack to perform container scanning during the run time of the yard crane 203. An extremely high-throughput port may be equipped with container scanning systems capable of scanning multiple containers in parallel at the end of each yard stack, in order to keep up with the flow. In FIG. 2, for example, one container scanner 208 may be configured to scan five containers lined up in parallel at a time. For example, such a container scanner 208 may include arrays of muon detectors located in parallel planes above and below the volume being scanned based on naturally occurring muons from cosmic rays on the surface of the earth as the source for muons in the container scanning. Because cosmic rays arrive from random skyward directions, the arrays cover a larger area than the horizontal surface area of the inspection volume to maximize the detection of particles passing through the inspection volume. As an example, to scan an individual 8×8×40 foot container in a single scan, the detector area should be approximately 18 by 60 feet in horizontal extent, in order to capture a large enough fraction of rays incident on the volume to scan the container efficiently. A large container scanner 208 for such parallel scanning operations can scan multiple containers set side by side, with a desired gap between the containers (e.g., 3 feet); the detector area is then approximately 50 or 60 feet wide by 60 feet long.

In operation, the automated scanning system can leave each container inside the scanner for different amounts of time, under separate control, depending on any one or more of container contents, image quality, or detection confidence level. A container may wait for the yard crane's return for a significant amount of time during the busy container processing at peak hours. This wait time provides an opportunity for using the disclosed technology in this patent document to perform the security scan of such containers so that 100% of the containers can be scanned without impeding the port's container traffic flow. In some instances, some containers may be passed through the device in four minutes or less, commensurate with the yard crane's round trip rate, while the occasional container requiring an extended scan can remain inside the scanning system.

Smaller ports with smaller yard stacks and lower average and peak throughput requirements can be supplied with smaller scanning systems accommodating fewer containers in parallel: perhaps even single containers, as in the standard MMPDS product.

In smaller ports, including ports dealing with more 20 foot containers than 40 foot, may be served with a smaller scanner such as a muon tomography scanning system that is designed to scan a single 20 foot container. It can measure just 40 feet long by 18 feet wide. It can also be used to scan 40 foot containers in two scans of half of the container with analysis of the combined data from the two scans producing a single reconstruction of the cargo contents. This would provide a low-cost implementation for lower throughput ports. Such half-length containers could also be scaled to scan multiple containers side by side.

In operation of the above disclosed container terminal with the container scanning in the yard stacks, the container information can be used by a port and adjacent, but separate, Customs/security facility in the following way as one example. An optical reader or other automated reader can be mounted on a ship crane to read the ID of a container as it is offloaded from a ship. The ID may be collated with an electronic container manifest with shipper, recipient, and contents information. This information is used by, or is used in combination with the container manifest by, the port to track the container through its journey from ship to AGV to yard stack and truck (or train) that picks it up. When the container reaches the scanning system 208 in FIG. 2 and the scanning is complete, the system appends scanning result to the ID and, optionally, the container manifest, to create scanning information package. This scanning information package is sent exclusively to the Customs and security facility, located outside the port facility, thus insulating the port from involvement in either Customs or security operations. In the rare instance where the scanning result indicates an imminent threat to the port itself, the port can be alerted by security before the container is moved, and appropriate actions can be taken.

Physical infrastructure needed to implement the scanning systems in container ports as described above can be in various configurations. Physical infrastructure includes civil and electrical engineering required to install and power the scanning systems, as well as to protect them from environmental effects, as needed. It also includes incorporation of automated shuttle devices to take a container from an AGV into the scanning system, and then out for pickup by a yard crane. Computing and communications infrastructure needed to implement the scanning systems in container ports as described above is taken as included in the invention. It includes computers located in the scanning system, at the offsite Customs/security facility, and, as needed, at the port's operational headquarters. It includes software operating in the computers to control the scanning system and interfaces to port and Customs/security systems. Communications infrastructure includes all wired, optical, and wireless connections between physical and computing hardware in the implementation, and in the interfaces to port and Customs/security systems. Heretofore, any inspection of cargo containers has been conducted outside the exit to a port, in an area under the control of a nation's Customs and/or security services. This recognizes the separation between the private-sector port's responsibility to transport goods as efficiently as possible and the government's responsibility to collect duties and exclude contraband including dangerous devices and materials. In order to facilitate the flow of commerce, most containers are only inspected by examination of the cargo manifest. Further inspections, via technical means such as scanning systems or via manual unpacking and inspection, are only performed if the manifest or other intelligence raises suspicion.

In order to maintain the separation of responsibilities and to avoid liability for transporting contraband, ports are reluctant to be exposed to any information resulting from cargo container inspections. This is an additional reason for their historical resistance to locating any scanning systems on port grounds.

A scanning system deployment and operation configuration is described that enables inspection of every cargo container without slowing port throughput and without exposing the port to liability. The configuration places an array of scanning systems in the port, at the location affording the greatest scanning time without slowing throughput. The configuration also routes scanning results directly to the Customs and security entities outside the port, linked to the container identification (ID) information, so that the port is not exposed to that information. The configuration thus alerts Customs and security, well in advance of a suspect container's arrival, of the need for further investigation. The configuration also informs Customs and security, well in advance of a cleared container's arrival, that it can proceed on its route without any delay.

One container scanning technology suitable for the above container terminal is muon tomography scanners. The following sections technical information on such scanners for container scanning integrated into a container terminal as shown in FIG. 2. Materials with high atomic weights such as nuclear materials can be detected by various methods. One notable technology is muon tomography which exploits scattering of highly penetrating cosmic ray-produced muons to perform non-destructive inspection of the material without the use of artificial radiation. The Earth is continuously bombarded by energetic stable particles, mostly protons, coming from deep space. These particles interact with atoms in the upper atmosphere to produce showers of particles that include short-lived pions which decay producing longer-lived muons. Muons interact with matter primarily through the Coulomb force without nuclear interaction. Muons radiate energy much less readily than electrons and lose energy due to scattering through electromagnetic interactions. Consequently, many of the cosmic ray-produced muons arrive at the Earth's surface as highly penetrating charged radiation. The muon flux at sea level is about 1 muon per $cm^2$ per minute.

Muon tomography utilizes cosmic ray-produced muons as probing particles and measures scattering of such muons that penetrate through a target object under inspection. As a muon moves through the material of the target object, Coulomb scattering off of the charges of sub-atomic particles perturb its trajectory. The total deflection depends on several material properties, but the dominant effect is the atomic number, Z, of nuclei. The trajectories are more strongly affected by materials that make good gamma ray shielding (such as lead and tungsten for example) and by special nuclear material (SNM), that is, uranium and plutonium, than by materials that make up more ordinary objects such as water, plastic, aluminum and steel. Each muon carries information about the objects that it has penetrated, and measurements of the scattering of multiple muons can be used to probe the properties of these objects. For example, a material with a high atomic number Z and a high density can be detected and identified when the material is located, inside low-Z and medium-Z matter.

Muon tomography scanners based on cosmic ray-produced muons rely on the natural density of the muons from the sky that cannot be increased artificially. Therefore, under this limit of incoming muons from the sky, a muon tomography scanner needs to let an object be exposed to the natural influx of muons from the sky for a minimum period of time to ensure that a sufficient number of muons penetrate through and are scattered by the object under inspection to generate a muon tomography image with sufficient details to enable the identification of the object and/or discrimination from the surrounding clutter. This operation is referred to as imaging scanning and the duration of such scanning is dictated by the time of the exposure to muons needed for a particular quality of muon tomography images. Long scanning times provide image details more than images obtained with shorter scanning times. In practical inspection systems, this aspect of the muon tomography scanner imposes a trade-off between the throughput of the inspection and the reliability of the inspection. Some small fraction of vehicles will contain suspect configurations of shielding, radiation emitting materials or other materials increasing suspicions of the presence of a threat. As an example, if 90% of vehicles do not contain suspect configurations and can be cleared in 30 seconds and 10% of vehicles contain suspect configurations requiring a minute to clear, the average throughput is 33 seconds per scan. 10% of scans do continue to 60 seconds, but the average throughput is negligibly affected.

One implementation of such a muon tomography scanner would inspect vehicles one at a time at a vehicle checkpoint, with each vehicle subject to the same scanning time, long enough to provide sufficient image detail to affirmatively discriminate and/or identify nuclear materials (and/or shielding) with a high level of confidence. This can unnecessarily lower the vehicle inspection throughput since a large majority of the vehicles are unlikely to carry suspect nuclear materials and thus do not need to undergo the same level of scrutiny as a few vehicles that may carry suspect shielding or nuclear materials. Such an inspection system is undesirable, particularly at checkpoints with high daily traffic.

Muon tomography scanners are particle detection devices to detect the presence of certain objects or materials such as nuclear materials and to obtain tomographic information of such objects in various applications including but not limited to inspecting packages, containers, vehicles, boats or aircraft at security check points, border crossings and other locations for nuclear threat objects that may range from fully assembled nuclear weapons to small quantities of highly shielded nuclear materials.

For example, a particle detection system can include an object holding area for placing an object (such as a vehicle, cargo container, or package) to be inspected, a first set of position-sensitive muon detectors located on a first side of the object holding area to measure positions and directions of incident muons towards the object holding area, a second set of position-sensitive muon detectors located on a second side of the object holding area opposite to the first side to measure positions and directions of outgoing muons exiting the object holding area, and a signal processing unit, which may include, e.g., a microprocessor, to receive data of measured signals of the incoming muons from the first set of position sensitive muon detectors and measured signals of the outgoing muons from the second set of position sensitive muon detectors. As an example, each of the first and second sets of particle detectors can be implemented to include drift tubes arranged to allow at least three charged particle positional measurements in a first direction and at least three charged particle positional measurements in a second direction different from the first direction. The signal processing unit is configured to analyze scattering behaviors of the muons caused by materials within the object holding area based on the measured incoming and outgoing positions and directions of muons to obtain a tomographic profile or the spatial distribution of scattering centers within the object holding area. The obtained tomographic profile or the spatial distribution of scattering centers can be used to reveal the presence or absence of one or more objects in the object holding area such as materials with high atomic numbers including nuclear materials or devices. Each position-sensitive muon detector can be implemented in various configurations, including using drift cells such as drift tubes filled with a gas which can be ionized by muons. Such a system can be used to utilize natural cosmic ray-produced muons for detecting one or more objects in the object holding area.

As will be explained in more detail below, in particular illustrative embodiments, the particle detection systems can utilize drift tubes to enable tracking of charged particles, such as muons, passing through a volume as well as concurrent detection of neutron particles. Such charged particle detectors can be employed in tracking and imaging using charged particles other than those produced by the cosmic rays incident on the earth's atmosphere. In general, these charged particle detectors are applicable to any charged particle from an appropriate source. For example, muons can be produced by cosmic rays or a low intensity beam of muons from an accelerator.

In applications for portal monitoring and other inspection type uses, the illustrative embodiments provide an approach to enabling robust nuclear material detection at a reduced cost and with increased effectiveness. Furthermore, the approach can provide a radiation portal monitor which is capable of determining if a given vehicle or cargo is free of nuclear threats by both measuring the absence of a potential shielded package and the absence of a radiation signature.

The muon tomography scanners of the illustrative embodiments shown in the accompanying drawings employ cosmic ray-produced charged particle tracking with drift tubes. As will be explained in more detail below, the muon tomography scanners can utilize drift tubes to enable tracking of charged particles of different kinds, such as muons, passing through a volume as well as detection of gamma rays by providing a proper gas mixture contained by the drift tubes. Advantageously, these portal monitoring systems can effectively provide the combined function of a cosmic ray radiography apparatus with passive or active gamma radiation counter to provide a robust detector for nuclear threats. This eliminates the need for two separate instruments for sensing muons and gamma rays separately. In implementation of the system, a gamma ray or neutron source can included in the system to enable active rather than only passive interrogation of the vehicle and thereby provide a detectable increase in the gamma ray counting rate.

Tomographic methods, designed to construct an image or model of an object from multiple projections taken from different directions, can be implemented in the cosmic ray system to provide a discrete tomographic reconstruction of the volume of interest based on the data provided by the muons. In some implementations, Monte Carlo simulation techniques can be used to study applications and shorten scanning times. Other stochastic processing methods may also be used in implementing the muon tomographic imaging.

Figure 3A:
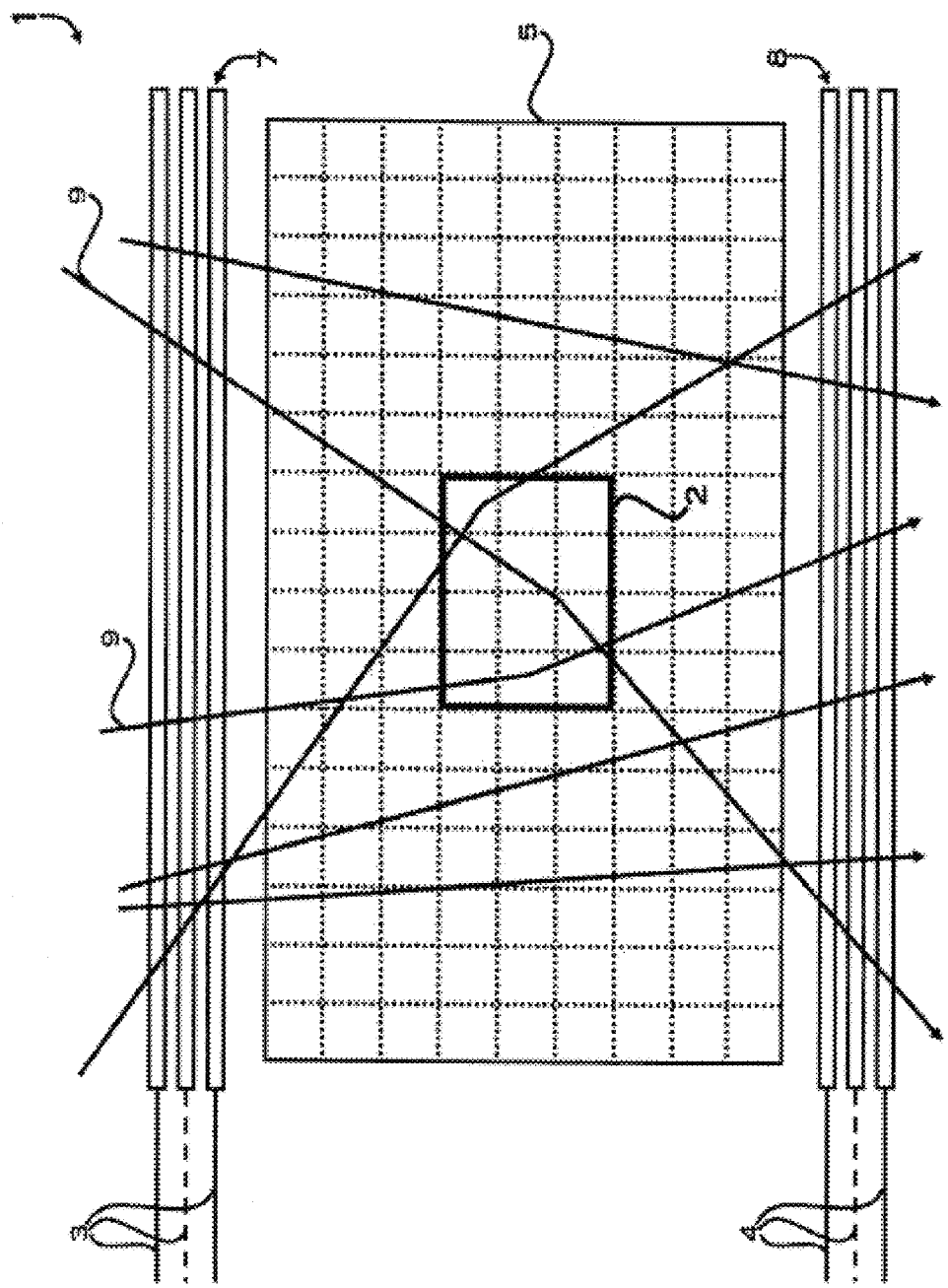
FIG. 3A illustrates an example of a muon tomography scanner system for portal monitoring and other inspection applications utilizing cosmic ray-produced muons to obtain images of an object.
Figure 3B:
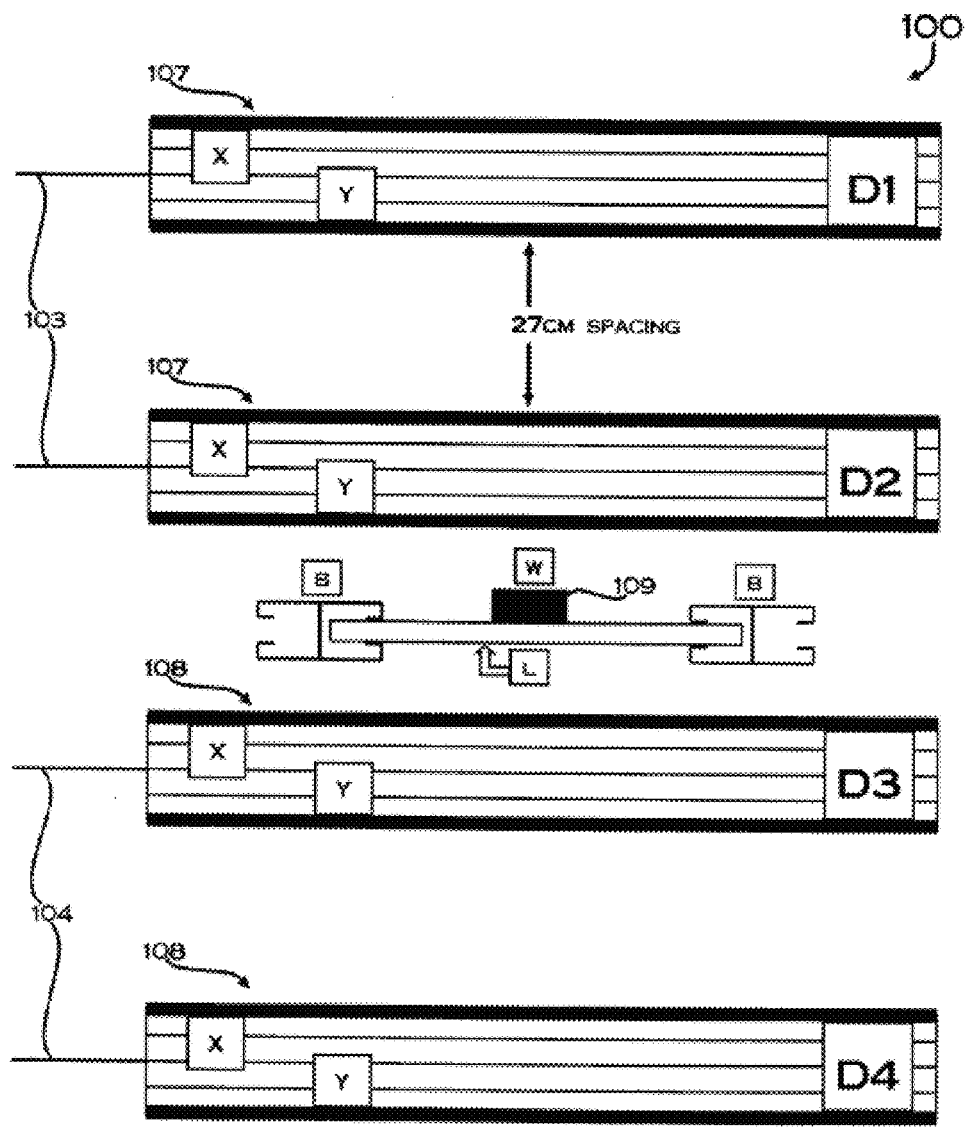
FIG. 3B illustrates a side view of a muon tomography scanner system utilizing cosmic ray-produced muons to detect an object.
Figure 4:
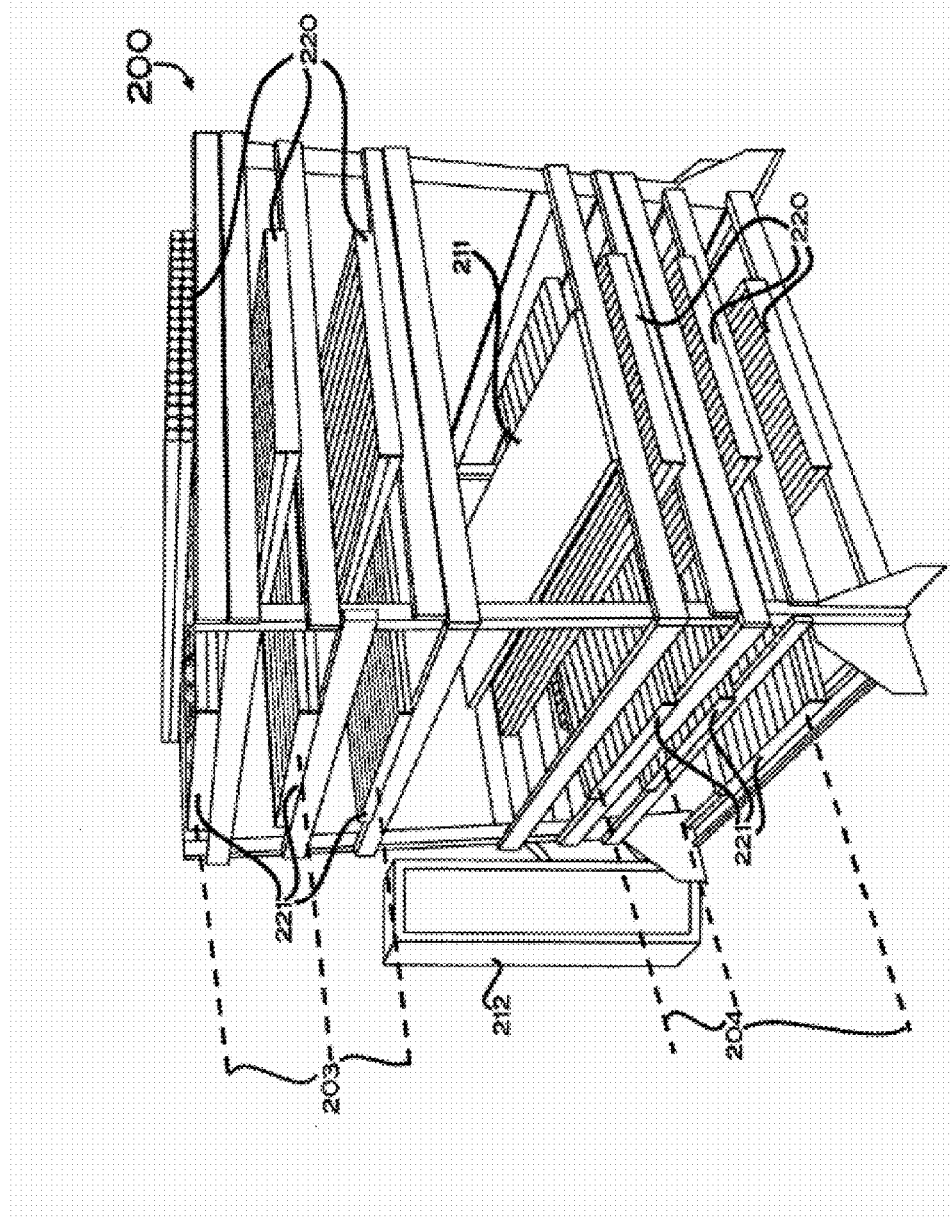
FIG. 4 illustrates a detailed perspective view of a muon tomography scanner system.

The cosmic ray radiography function of the particle detection systems of the embodiments can be more readily understood with reference to examples of detection systems adapted to detect cosmic ray-produced charged particles such as those shown in FIGS. 3A, 3B and 4 which use reference numbers of their own that have no relationship with the reference numbers in FIG. 2 above.

FIG. 3A illustrates a muon detection system utilizing cosmic ray-produced muons to detect an object. The system 1 includes a set of two or more planes 3 of position-sensitive muon detectors 7 arranged above a volume 5 to be imaged for providing the position and angles (i.e., directions in the 3-D space) of incoming muon tracks 9. The muon detectors 7 are configured to measure the position and angles of incoming muon tracks 9 with respect to two different directions, e.g., in two orthogonal coordinates along x and y axes. Muons pass through the volume 5 where the object 2 may be located and are scattered to an extent dependent upon the material 2 occupying the volume through which they pass. Another set of two or more planes 4 of position-sensitive muon detectors 8 are configured to record outgoing muon positions and directions. The drift tubes in detectors 7 and 8 are arranged to allow at least three charged particle positional measurements in a first direction and at least three charged particle positional measurements in a second direction which is different from the first direction and may be orthogonal to the first direction. Side detectors (not shown) may be used to detect more horizontally orientated muon tracks. The scattering angle of each muon is computed from the incoming and outgoing measurements. Each drift tube can include a non-flammable gas, such as a mixture of argon, carbon dioxide and Tetrafluoromethane ($CF_4$).

A signal processing unit, e.g., a computer, is provided in the system 1 to receive data of measured signals of the incoming muons by the detectors 7 and outgoing muons by the detectors 8. This signal processing unit is configured to analyze the scattering of the muons in the volume 5 based on the measured incoming and outgoing positions and directions of muons to obtain a tomographic profile or the spatial distribution of the scattering density reflecting the scattering strength or radiation length within the volume 5. The obtained tomographic profile or the spatial distribution of the scattering density within the volume 5 can reveal the presence or absence of the object 2 in the volume 5. FIG. 3A shows drift tube detectors 7 and 8 are located on top and bottom sides of the volume 5. In some implementations, additional drift tube detectors can be implemented on sides of the volume 5 to form a box or four sided structure into which a package, a vehicle or cargo container can enter for scanning by the system. In some embodiments, the tomographic profile or the spatial distribution may be two-dimensional images. In some embodiments, the tomographic profile or the spatial distribution may be three-dimensional images.

The processing of measurements for cosmic ray-produced muons in a volume under inspection (e.g., a package, a container or a vehicle) by the processing unit for the system 1 in FIG. 3A, and other systems described in this application can include reconstructing the trajectory of a charged particle such as a muon through the volume 5, measuring the momentum of an incoming muon based on signals from the detectors 7, measuring the momentum of an outgoing muon based on signals from the detectors 8, and determining the spatial distribution of the scattering density of the volume 5. These and other processing results can be used to construct the tomographic profile and measure various properties of the volume 5.

For example, the reconstruction of the trajectory of a charged particle passing through a detector having a set of drift cells can include (a) obtaining hit signals representing identifiers of drift cells hit by charged particles and corresponding hit times; (b) grouping in-time drift cell hits identified as being associated with a track of a particular charged particle passing through said detector; (c) initially estimating a time zero value for a moment of time at which said particular charged particle hits a drift cell; (d) determining drift radii based on estimates of the time zero values, drift time conversion data and the time of the hit; (e) fitting linear tracks to drift radii corresponding to a particular time zero value; and (f) searching and selecting a time-zero value associated with the best of the track fits performed for a particular charged particle and computing error in time-zero and tracking parameter. Such reconstruction of the track based on the time zero fit provides a reconstructed linear trajectory of the charged particle passing through the charged particle detector without having to use fast detectors (such as photomultiplier tubes with scintillator paddles) or some other fast detector which detects the passage of the muon through the apparatus to the nearest few nanoseconds to provide the time-zero.

Also for example, the processing for measuring the momentum of an incoming or outgoing muon based on signals from the detectors can include, for example, (a) configuring a plurality of position sensitive detectors to scatter a charged particle passing there through; (b) measuring the scattering of a charged particle in the position sensitive detectors, wherein measuring the scattering comprises obtaining at least three positional measurements of the scattering charged particle; (c) determining at least one trajectory of the charged particle from the positional measurements; and (d) determining at least one momentum measurement of the charged particle from the at least one trajectory. This technique can be used to determine the momentum of the charged particle based on the trajectory of the charged particle which is determined from the scattering of the charged particle in the position sensitive detectors themselves without the use of additional metal plates in the detector.

Also for example, the spatial distribution of the scattering density of the volume can be determined from charged particle tomographic data by: (a) obtaining predetermined charged particle tomography data corresponding to scattering angles and estimated momentum of charged particles passing through object volume; (b) providing the probability distribution of charged particle scattering for use in an expectation maximization (ML/EM) algorithm, the probability distribution being based on a statistical multiple scattering model; (c) determining substantially maximum likelihood estimate of object volume density using the expectation maximization (ML/EM) algorithm; and (d) outputting reconstructed object volume scattering density. The reconstructed object volume scattering density can be used to identify the presence and/or type of object occupying the volume of interest from the reconstructed volume density profile. Various applications include cosmic ray-produced muon tomography for various homeland security inspection applications in which vehicles or cargo can be scanned by a muon tracker.

The tomographic processing part of the signal processing unit may be implemented in a computer at the same location as the detectors 7 and 8. Alternatively, the tomographic processing part of the signal processing unit may be implemented in a remote computer that is connected on a computer network such as a private network or a public network such as the Internet. The remote computer may be located at an offsite customers or security facility. The remote computer may receive integrated data package that may include raw data from the muon tomography scanner so that tomographic processing part of signal processing unit may process the raw data and generate two-dimensional images or three-dimensional images. The remote computer may also receive integrated data package that may include any one or more of the following items: the container identification, the container manifest, any one of raw data related to the container's contents or processed images of the container's contents, assessment of the contents of the container, a clear signal in response to determining that the potential threat materials or contraband materials are not present in the container, or an alert signal in response to assessing that the potential threat materials or contraband materials are present in the container. The clear signal or the alert signal allows customs or security to take certain actions. For example, in case of a clear signal, the container may be shuttled out of the scanning system for pickup by a yard crane.

Thus, multiple scattering of cosmic ray-produced muons can be used to selectively detect high-Z material in a background of normal cargo. Advantageously, this technique is passive, does not deliver any radiation dose above background, and is selective of high-Z dense materials.

FIG. 3B illustrates a side view of another detection system utilizing cosmic rays to detect an object, the system 100 has two planes 103 of muon detectors 107 located above the sample 109 and two planes 104 of muon detectors 108 located below the sample 109. In the system 100 the two planes of muon detectors in each of 103 and 104 are separated by a spacing of 27 cm.

FIG. 4 illustrates a detailed perspective view of another charged particle detector 200 in which position sensitive detectors 203 are arranged above the sample holder plane 211 and position sensitive detectors 204 are arranged below the sample holder plane 211. Each set of position sensitive detectors comprises a first double-layer 220 of drift tubes 203 or 204 arranged in the X direction and a second double-layer 221 of drift tubes 203 or 204 arranged in the Y direction. In each of the layers 220, 221, the drift tubes 203 or 204 are arranged in two rows, offset by half a tube diameter from each other.

Drift tube modules 203 and 204 are operable to detect both cosmic ray-produced muons and gamma rays. In the system of FIG. 4, the drift tube modules are made up of 12 foot long aluminum drift tubes which are configured to measure the position and angle of incoming and outgoing muon tracks in the X and Y coordinate directions. The aluminum in the detectors provides a considerable amount of mass in which gamma rays and energetic electrons are absorbed or scattered. The energetic electrons produced in these processes are detected locally in the drift tubes in the same way that more energetic cosmic rays are detected.

The tubes can be arranged in different ways. For example, the layers need not have to be 90 degrees from one another, but can be smaller non-zero angles. Also by way of example, the top layer could be at 0 degrees, middle layer at 45 degrees from the first, and a third layer 90 degrees from the first. This would allow resolution of multiple tracks that occur at the same instance of time.

Also, other position sensitive detector arrangements capable of scattering the charged particle passing there through and providing a total of at least three individual positional measurements can be adopted instead of the arrangement of detectors of FIG. 2. At least 3 position measurements are required so as to enable a line fit with a free parameter from which one can track the particle.

In one example implementation, the data acquisition electronics 212 is operably coupled to the drift tubes. Drift tubes of the detector system 200 of FIG. 4 are connected to respective electronic amplifiers (not shown) which increase the voltage of the deposited signal (associated with a cosmic ray-produced muon passing through a drift tube). For each drift channel, the amplified signal is turned into a digital signal with a piece of electronics called a discriminator (on if there is a hit, off if no hit), which preserves the precise time of the hit. This combination of amplifier and discriminator is the "front-end" electronics. The time and channel number that the digital signal is registered to the nearest nanosecond by the time-to-digital-converters (TDCs). Each drift tube has its own front-end electronics and TDC. In some embodiments, TDCs can perform auto thresholding. Auto thresholding can make threshold adjustments for tubes that have statistically high or statistically low hits by appropriately changing threshold level at which a tube pulse hit is detected. The TDC can send a minimum of tube hit rates, high voltage status, and synch status for performance monitoring purposes The front-end electronics can be custom built for the purpose of processing signals from drift-tubes. Analog-to-digital electronics circuitry identifies current pulses on the wires of the drift-tubes. This circuit converts the pulse to digital levels corresponding to the crossing of current thresholds of the current on the wire. These digital levels are time-tagged in the TDC and delivered to a CPU for further processing. The data is processed to identify the cosmic ray events. Candidate muon-track-events are processed to reconstruct a measured trajectory for the muon as it traversed the detectors. The event data, track data, and pertinent diagnostic data are also stored on the hard drive. The processing of measurements for cosmic ray-produced muons in a volume under inspection (e.g., a package, a container or a vehicle) by the data acquisition unit of the system of FIG. 4, or other signal processing unit linked thereto, can be similar to those explained above for the system of FIG. 3A. For example, processing measurements may be reconstructing the trajectory of a muon through the volume, measuring the momentum of an incoming muon based on signals from the detectors, measuring the momentum of an outgoing muon based on signals from the detectors, and determining the spatial distribution of the scattering density of the volume.

Advantageously, the system 200 in FIG. 4 can selectively detect high density shielding of radioactive material occupying the volume from multiple scattering of the cosmic ray-produced muons whilst also counting gamma rays emitted from the radioactive material. In addition to detecting high density materials, such as lead, gold, tungsten, uranium and plutonium, the system can be employed to detect medium density materials, such as steel, iron and copper, and also low density materials, such as water, plastic, concrete and aluminum, albeit with a somewhat lower accuracy than for high density materials. This capability may allow the scanner to detect, discriminate, and/or identify objects other than nuclear materials and shielding.

In addition, other scanning systems may be used to implement the container scanning operation in the container terminal in FIG. 2. Examples of the various features of the embedded container scanner 208 in FIG. 2 are provided in part in applicant's prior patent documents, U.S. Patent Publication No. US 2016/0041297 A1 entitled "Material Discrimination Using Scattering and Stopping of Muons and Electrons," U.S. Pat. No. 8,247,767 B2 entitled "Particle Detection and Applications in Security and Portal Monitoring," U.S. Pat. No. 8,288,721 B2 entitled "Imaging and Sensing Based on Muon Tomography," and U.S. Pat. No. 8,536,527 B2 entitled "Imaging Based On Cosmic-Ray Produced Charged Particles," all of which are incorporated herein by reference in their entireties for all purposes.

The following sections provide examples of scanner features that can be implemented in the disclosed container terminal.

Figure 5:
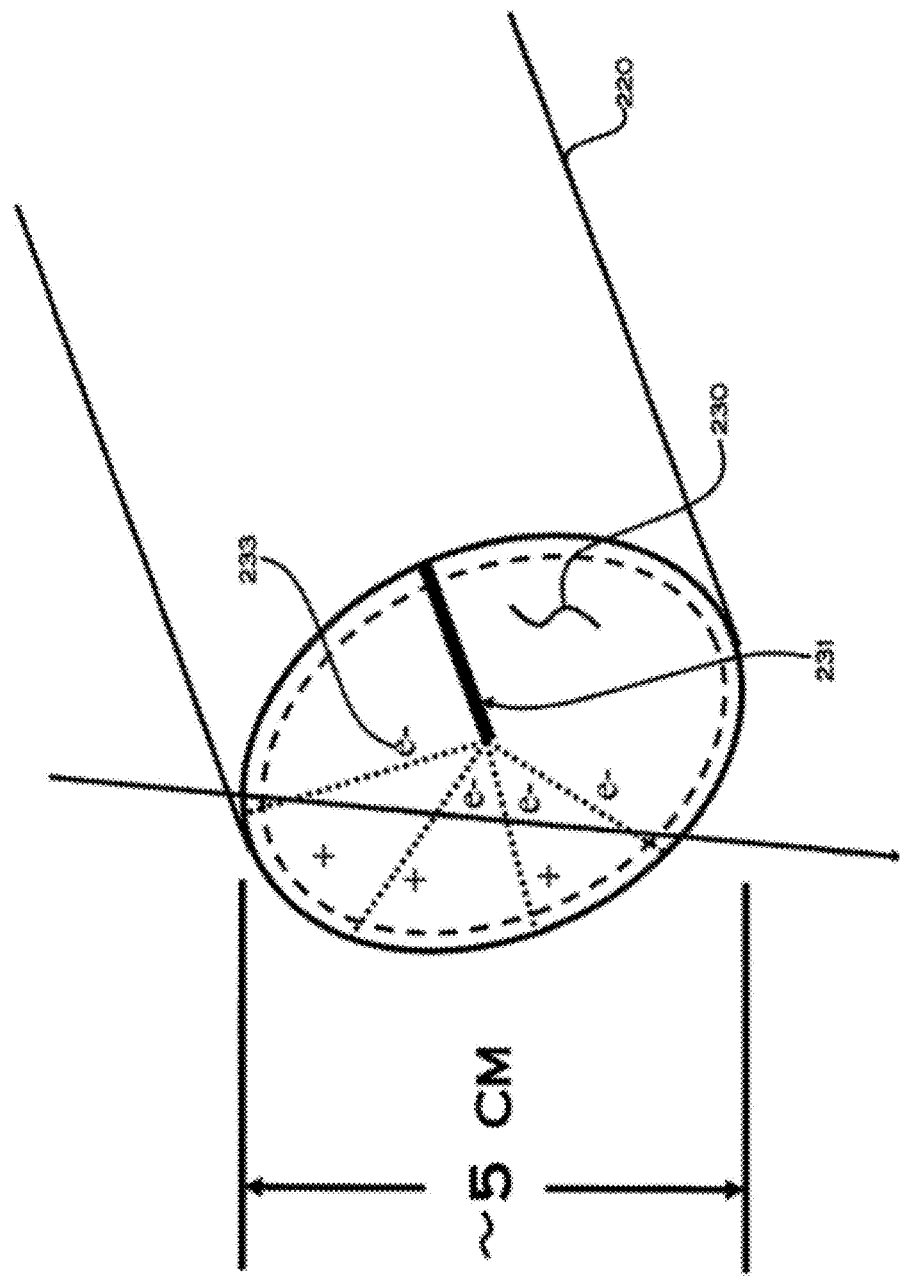
FIG. 5 illustrates a cross-sectional view of part of a drift tube module configured to detect cosmic ray charged particles and gamma rays according to one embodiment.

FIG. 5 illustrates a cross-sectional view of part of a drift tube module 204 that is suitable for constructing the detectors used in a muon detection system utilizing cosmic ray-produced muons illustrated in FIGS. 3A, 3B and 4 for the disclosed container terminal. The drift tube module in this particular example is cylindrical and filled with a detector gas such as Argon-Isobutane 230 to enable detection of the cosmic ray-produced charged particles, such as muons. The system is configured to apply a positive high voltage of about +2-3 kV to a central anode wire 231 extending along the length of the cylindrical tube with the tube at ground so that a high-voltage static field is also present. When the charged particle interacts with gas atoms, many electrons 233 are liberated from those atoms along the charged particle's straight line path through a chord of the tube. The static field causes the "string" of electrons to drift toward the positively charged anode wire which is read-out electronically with TDCs (time-to-digital converters) of the data acquisition electronics 212.

Whilst in the drift tube of the illustrative embodiment of FIG. 5, the detector gas is Argon-Isobutane 230, other operating gas mixtures may be Argon/carbon dioxide or Argon/isobutane/carbon dioxide and can include hydrocarbons such as methane, propane, pentane and the like. An example of an operating gas mixture is 10% methane, 90% argon. Furthermore, non-flammable gas mixtures such as Argon-carbon-dioxide-tetrafluoromethane (CF4) may alternatively be employed as the operating gas. Also, ethane or other gases may be adopted in the gas mixtures. For example, a mixture of 5% of ethane, 45% of CF4 and 50% of Argon is a suitable non-flammable operating gas. Inert gases other than Argon can be used in the gas mixture.

Also, whilst the drift tube of FIG. 5 is manufactured from aluminum, other materials such as carbon composite with internal conductive coatings can be adopted instead of aluminum. The drift tubes need not have circular cross-sections. For example, the drift tubes may be constructed from aluminum extrusions with multiple, non-circular cross-sections.

Alternatively, drift cells other than drift tubes can be adopted such as for example triangular shaped drift cells.

Figure 6:
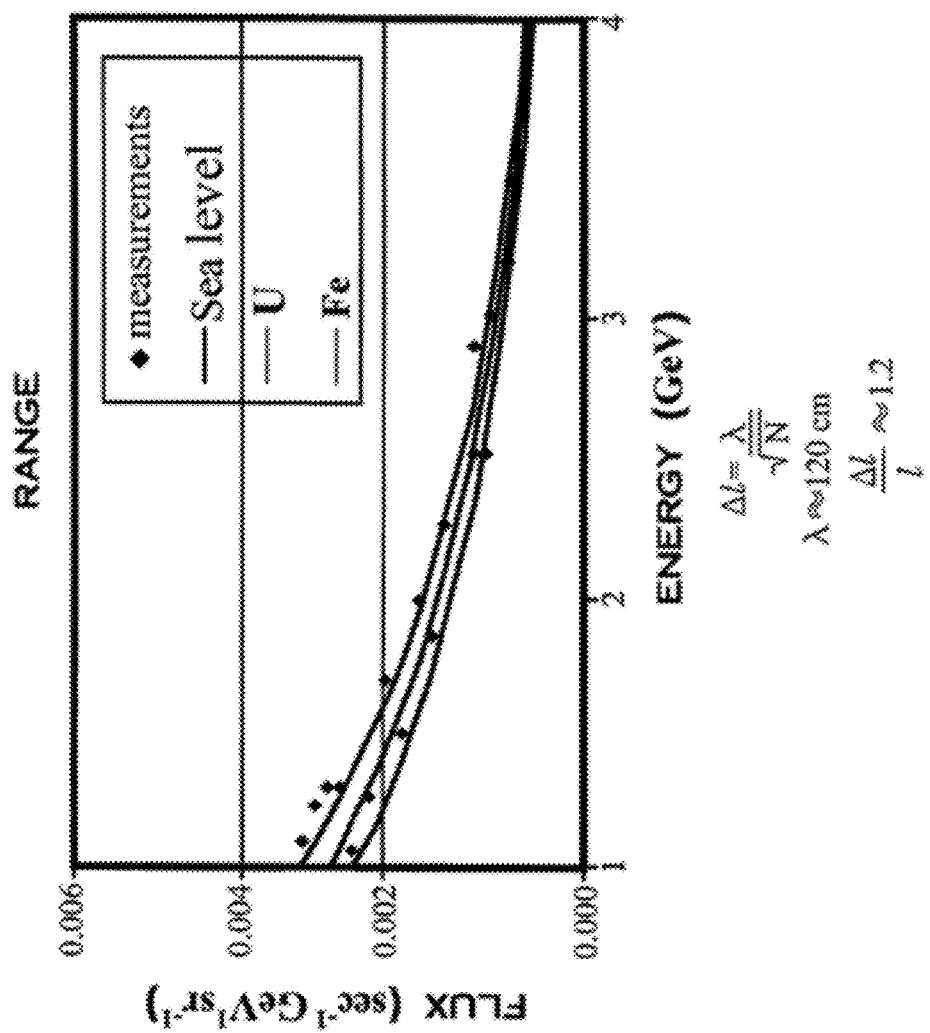
FIGS. 6 and 7 respectively illustrate typical experimental range data and multiple coulomb scattering theoretical results of measuring 1000 cm2 of uranium for 1 minute with a cosmic ray system.
Figure 7:
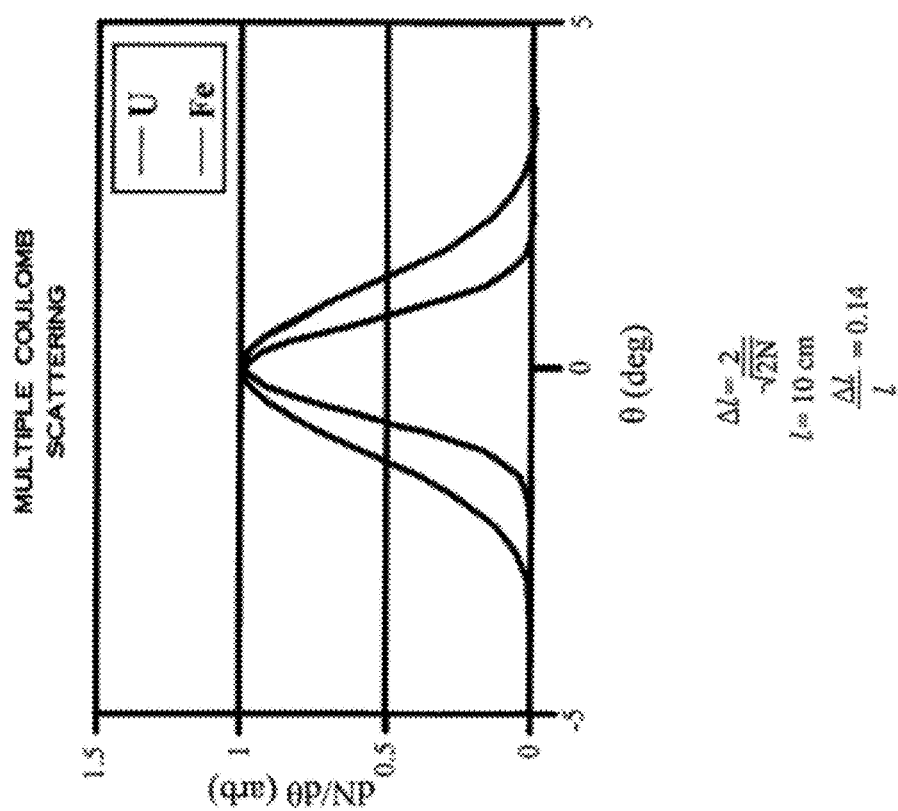

FIGS. 6 and 7 respectively illustrate exemplary experimental range data and multiple Coulomb scattering theoretical results of measuring 1000 cm3 of uranium for 1 minute with a cosmic ray-produced muon detection system. These measurements and computations demonstrate that charged particle (muon) tomography is much more sensitive than the range radiography previously employed in searches for hidden chambers in an Egyptian pyramid and measurement of geological overburden.

Referring to the table of FIG. 8, this table illustrates theoretical energy loss rate (dE/dx) and radiation length (X) for various materials. One minute of counting distinguishes a 10 cm cube of iron from a 10 cm cube of lead at 6 standard deviations on the basis of their different values of X.

Figure 9:
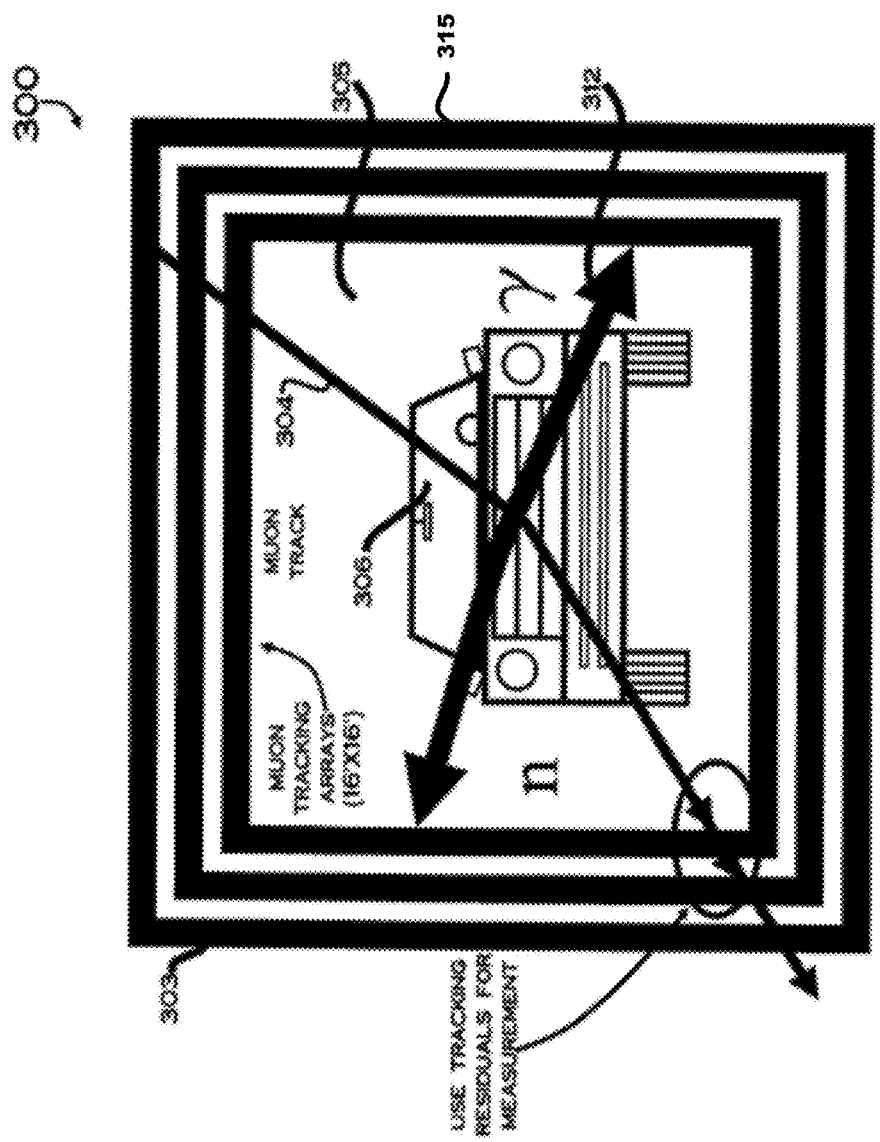
FIGS. 9 and 10 illustrate portal monitoring systems adapted and arranged to monitor cargo in vehicles and containers according to alternative embodiments.

FIG. 9 illustrates a particle detection system 300 adapted and arranged to monitor cargo in vehicles and containers at ports and border crossings according to one embodiment. The particle detection system 300 uses a muon tomography system with a plurality of detector drift tubes 303 configured to track cosmic ray-produced muons 304 scattered by the cargo or contents of a vehicle 306 occupying the volume 306 and configured to concurrently detect any neutrons 314 emitted from the vehicle contents. The system 300 can be employed for inspecting occupied vehicles at border crossings for nuclear threat objects which might range from fully assembled nuclear weapons to small quantities of highly shielded nuclear materials. The system 300 can be used to pass innocent vehicles in less than 30 seconds, detect several Kgs of highly enriched uranium (HEU) in less than 60 seconds (shielded or unshielded) and detect plutonium or HEU nuclear devices in less than 60 seconds (shielded or unshielded).

Advantageously, using the drift tubes 303 to both passively count gamma radiation 312 emitted from the vehicle 306 or container (not shown) and track the scattered cosmic ray-produced charged particles 304 enables the system to perform passive scanning of containers or occupied passenger vehicles with short scanning times and no dose radiation.

A method of operating the particle detection system (such as a portal monitoring system or a scanning system) 300 of FIG. 9 according to one embodiment involves detecting with the drift tubes 303 incoming and outgoing cosmic ray-produced charged particles 304 together with any gamma rays 312. The multiple scattering of the charged particles are then computed to selectively detect a material, particularly high density material, occupying the volume 305. Gamma rays 312 emitted from the volume can be counted by the data acquisition electronics to detect whether any radioactive source is occupying the volume 305.

In an alternative embodiment, a portal monitoring system (not shown) is provided which is identical to that of the portal monitoring system 300 of FIG. 9 with the exception that the system also includes a gamma ray or neutron source within the apparatus to enable active rather than only passive interrogation of the vehicle and thereby provide a detectable increase in the gamma ray counting rate. In some embodiments, the operation of the gamma ray or neutron source may be controlled by a signal processing unit.

Figure 10:
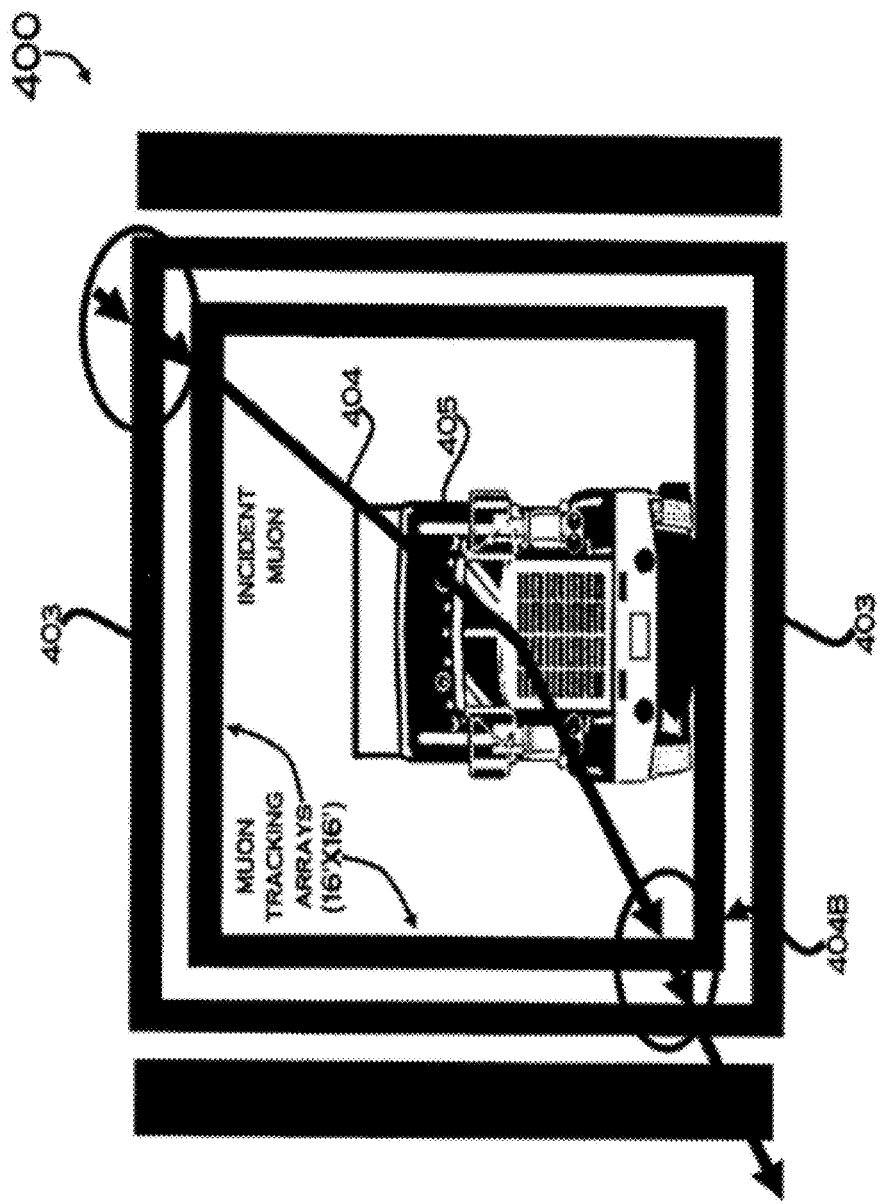

A particle detection system (e.g., a portal monitoring system) according to another alternative embodiment is illustrated in FIG. 10. System 400 is similar to the system 300 of FIG. 9 in that it is configured to both passively count gamma radiation emitted from the vehicle and track the scattered cosmic ray-produced charged particles 404. The drift tube detectors arrays 403 are 16 foot long to enable interrogation of a truck 405 but may be other lengths dependent on the object being scanned. In order to obtain major gains in rate, the solid angle can be increased by filling out the drift tube detectors 403. Furthermore, the system is configured to use tracking residuals 404B for momentum measurements.

In another alternative embodiment, a portal monitoring system which is identical to the system 300 of FIG. 9, has drift tubes which are sealed advantageously further to decrease cost and complexity of the system by eliminating the need for a gas handling system.

Both plutonium and weapons grade uranium are sources of neutrons either from the amplification of the natural neutron background ("fission chains") or from individual spontaneous fissions within the material. The particle tracking system 300 is similar in construction to the system 200 of FIG. 4 and in the system 300 the drift tubes are arranged to form a box or four sided structure 315 around the volume to be scanned 305.

In one implementation, the drift tubes may be designed to include a neutron sensitive medium to enable the drift tubes to concurrently detect any neutrons emitted from a shipping container or vehicle 306. The neutron sensitive medium can include Helium-3, Boron or Lithium and can be in solid, liquid or gas form. A hydrogenous material, such as hydrogenous organic materials (e.g., Polyethylene and paraffin) or water, can be used to trap and confine neutrons so that they pass through the drift cells multiple times and are isolated from the material or devices being scanned. Such a hydrogenous material can also moderate the neutron energy by slowing down the neutrons to increase their interaction cross-section by very large factors. Boron or a boron compound may be enriched in the isotope boron-10 and lithium or a lithium compound can be enriched in the isotope lithium-6. The operating gas of the drift tubes can comprise a mixture of argon and at least one gas selected from the group consisting of carbon dioxide, isobutane, tetrafluoromethane and ethane to enable counting of gamma rays such that, in use, the system can additionally detect any radioactive sources occupying the volume from gamma rays emitted therefrom.

The drift tubes may also be configured to include a gamma ray scattering solid material to enable detection of gamma rays. Helium-3 can be added to any of these gases to permit simultaneous neutron detection by the same drift tube. If the drift tube contains only argon and tetrafluoromethane then boron trifluoride, possibly advantageously enriched in the isotope boron-10, could be added to permit simultaneous neutron detection by the same drift tube. Alternatively, neutron detectors could utilize drift tubes optimized for that purpose, distinct from the tubes for detection of charged particles (muons).

The detection of neutrons can be achieved in many ways. In the illustrative example in FIG. 9, the operating gas of the tracking drift tubes 303 includes a partial pressure of Helium-3 (3He) which constitutes the neutron sensitive medium to enable the drift tubes to concurrently detect any neutrons. For example, the operating gas can be a combination of Helium-3 (3He), ethane, tetrafluoromethane and argon. The detector can also use Helium-3 (3He) in combination with other different sets of fill gases.

This combined use of cosmic muon ray detection and neutron detection function is illustrated in FIG. 9. The neutrons are seen in the normal electronics as much larger pulses than those of the muons. This is due to the high energy loss rate of the protons produced by neutron interaction with helium-3 or of the massive charged particles produced by neutron interaction with boron-10 or lithium-6. The drift tubes 303 can be sealed further to decrease cost and complexity of the system by eliminating the need for a gas handling system. The system can also be used to detect gamma rays 312 in the same manner as the system 200 of FIG. 4.

Using the drift tubes 303 to both passively count neutron and optionally gamma particles 314 emitted from the vehicle 306 or container and track the scattered cosmic ray-produced charged particles 304 (muons) enables the system to function as an efficient monitor of radiation emitted by threat objects in addition to cosmic ray imaging providing a more compact and cost effective detector system to look for nuclear devices and materials at border crossings and ports. Addition of the neutron sensitive medium to the tracking drift tubes 303 provides efficient selective neutron detection with no impact on muon tracking and allows detection of unshielded neutron sources in vehicles and containers. This has various benefits over using separate systems to detect neutrons and radiograph vehicles. For example, the single detector system is cheaper than several systems. For another example, the system takes up less space which is limited. As the third example, the detector system can provide positioning information about the neutron source, independent of the muon signal. A method of operating the particle detection system 300 of FIG. 9 according to one embodiment involves detecting with the drift tubes 303 incoming and outgoing cosmic ray-produced charged particles 304 together with any gamma rays 312. The multiple scattering of the charged particles are then computed to selectively detect material, particularly high density material, occupying the volume 305. Any neutron particles emitted from the volume 305 are counted by the data acquisition electronics (not shown) to detect if any unshielded neutron source is occupying the volume. Any gamma rays 312 emitted from the volume can also be counted by the data acquisition electronics to detect if any radioactive source is occupying the volume 305.

Alternatively or additionally, the neutron sensitive medium can be a solid layer or region of neutron sensitive material instead of a gas medium. A drift tube having an anode wire includes a conductive neutron sensitive layer disposed on the interior wall of the drift tube. The neutron sensitive layer can be for example a conductive compound of lithium or boron. The neutron sensitive layer 604 can be used in conjunction with or without helium-3 (3He) in the detector gas. In alternative embodiments, the drift tubes or other drift cells including neutron sensitive material need not be arranged to form a four sided structure as shown in FIG. 9. For example, the neutron sensitive drift tubes can be arranged to form a top and bottom side structure such as that of the detector system 200 of FIG. 4. In yet another alternative embodiment, a particle detection system (not shown) is provided which is identical to that of the particle detection system 300 of FIG. 9 with the exception that the system also includes a gamma ray and/or neutron source within the apparatus to enable active rather than only passive interrogation of the vehicle and thereby provide a detectable increase in the gamma ray and/or neutron counting rate.

The illustrative embodiments demonstrate that the combination of cosmic ray radiography with passive or active counting therefore provides a robust detector for nuclear threats. Conventional radiography alone is defeated by packaging nuclear material in packages too small to be resolved by the radiography. Passive counting can be defeated by shielding the material with high-z material. The shielding makes the threats move visible radiographically and dispersing the material in many cases enhances the passive signature. Combining these techniques allows one to determine if a given vehicle is free of threats by measuring the absence of a potential shielded package and the absence of a radiation signature.

A muon detection system utilizing cosmic ray-produced muons to detect an object for implementing the disclosed container terminal can be configured to use various imaging techniques. Tracking pass-through charged particles such as muons provides one mechanism for determining the contents of a container. Other mechanisms may also be used. For example, subtraction techniques can be used to enhance the processing of the muon tomography data. When reconstructions are performed on short exposure datasets (e.g., several voxels traversed by less than a few muons), it is common for the large integrated scattering from thick, medium-Z objects to be placed in a single voxel. For longer exposures that produce several muons traversing the entire large medium-Z object across several voxels, the nuclear density can properly distribute over the volume of the object. With low threat density thresholds, it is common for these short exposure reconstructions to be found threatening, extending the average time it takes to clear innocuous scenes. The implementation of certain background subtraction algorithms mitigates this issue, greatly reducing the average time to clear innocent scenes.

In one aspect, a particle detection system is described to include a first set of position sensitive muon detectors located on a first side of an object holding area to measure positions and directions of incident muons towards the object holding area, a second set of position sensitive muon detectors located on a second side of the object holding area opposite to the first side to measure positions and directions of outgoing muons exiting the object holding area, and a signal processing unit, which may include, e.g., a microprocessor, to receive data of measured signals of the incoming muons from the first set of position sensitive muon detectors and measured signals of the outgoing muons from the second set of position sensitive muon detectors. This signal processing unit is configured to analyze scattering behaviors of the muons caused by scattering of the muons in the materials within the object holding area based on the measured incoming and outgoing positions and directions of muons to obtain a tomographic profile or the spatial distribution of scattering centers within the object holding area. The obtained tomographic profile or the spatial distribution of scattering centers can be used to reveal the presence or absence of one or more objects in the object holding area such as materials with high atomic numbers including nuclear materials or devices. Each position sensitive muon detector can be implemented in various configurations, including drift cells such as drift tubes filled with a gas which can be ionized by muons. Such a system can be used to utilize natural cosmic ray-produced muons as the source of muons for detecting one or more objects in the object holding area. In one implementation, the signal processing unit is operable to subtract a reference cosmic muon image that represents a background of an object, cargo, container or vehicle under inspection in the object holding area from an obtained cosmic muon image of the object, cargo or vehicle under inspection to obtain a subtracted image; and process the subtracted image to determine whether the object, cargo or vehicle under inspection contains a target object that is absent from the reference cosmic muon image.

In another aspect, a method is provided for using natural cosmic muons as a radiation source to obtain muon tomographic images of an object, cargo or vehicle under inspection. This method includes obtaining one or more cosmic muon images of an object, container, cargo or vehicle under inspection; subtracting a reference cosmic muon image of a reference object, container, cargo or vehicle that represents a background of the object, cargo or vehicle under inspection from an obtained cosmic muon image of the object, container, cargo or vehicle under inspection to obtain a subtracted image; and processing the subtracted image to determine whether the object, container, cargo or vehicle under inspection contains a target object that is absent from the reference cosmic muon image.

In another aspect, a method of inspection using muon tomography, comprising: scanning a vehicle or cargo container using muon sensors to obtain muon tomography imaging data; creating a reconstruction of the vehicle or cargo container from the muon tomography imaging data; subtracting a reconstruction of a known background model for the vehicle or cargo container from the reconstruction of the vehicle or cargo container to obtained a subtracted image; and analyzing the subtracted image to detect whether a target object is present in the vehicle or cargo container.

Figure 11:
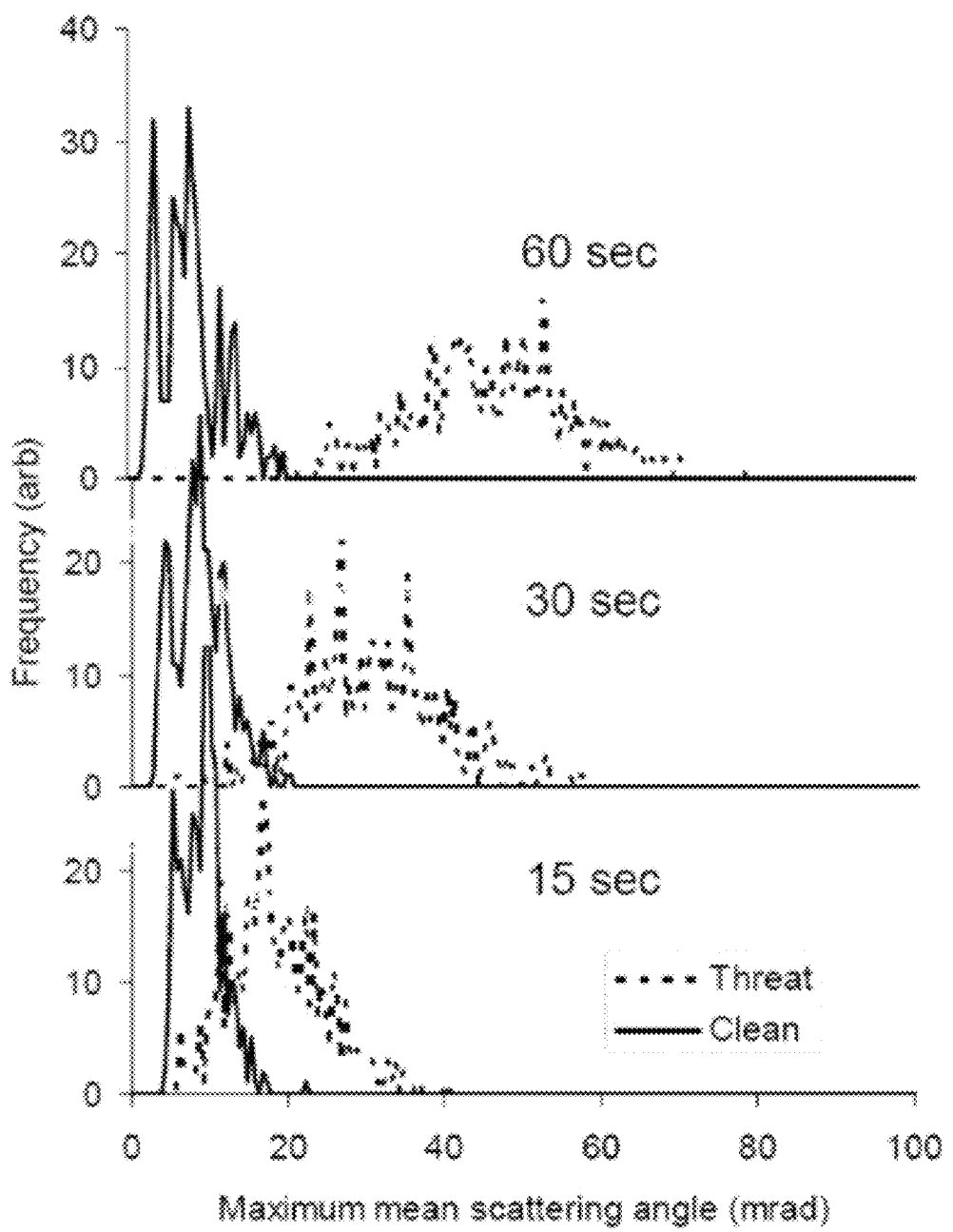
FIGS. 11, 12 and 13 illustrate muon tomography techniques based on prior knowledge and subtraction of a known reference background image.
Figure 12:
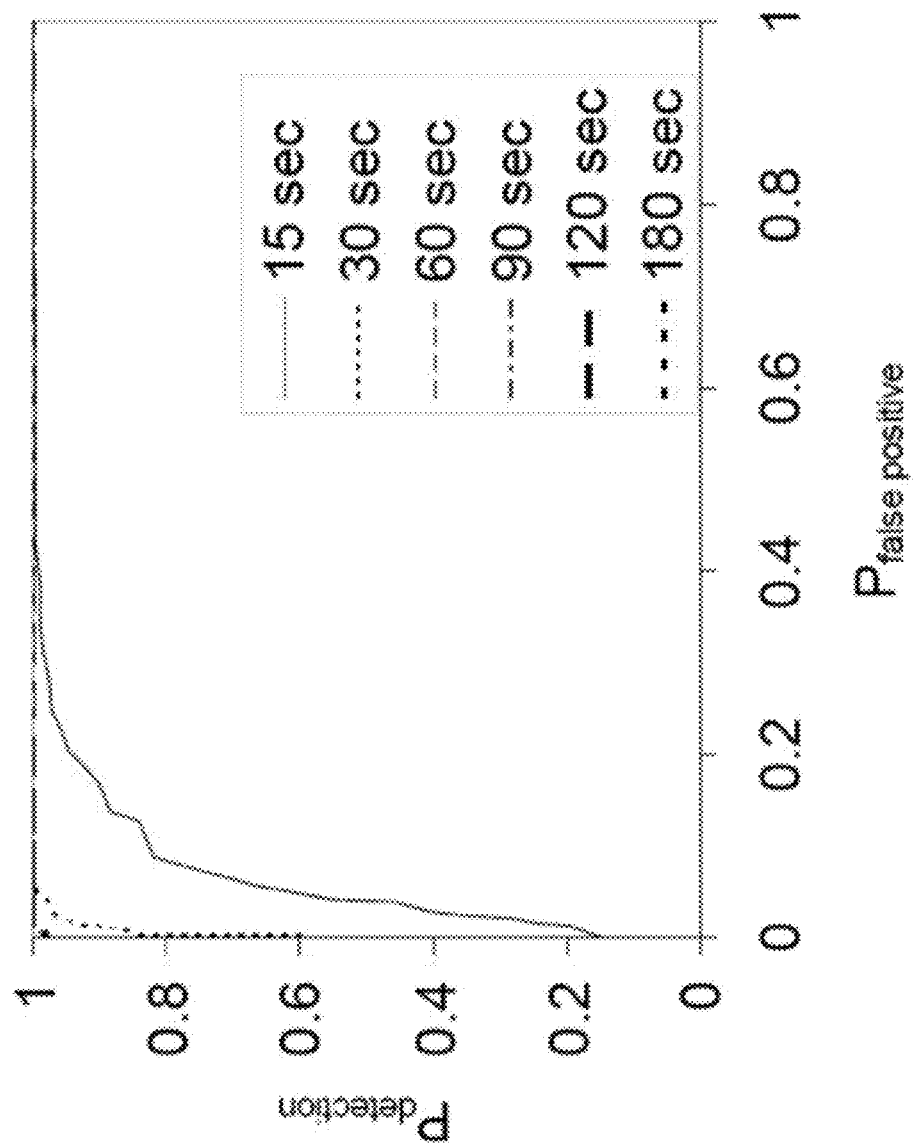
Figure 13:
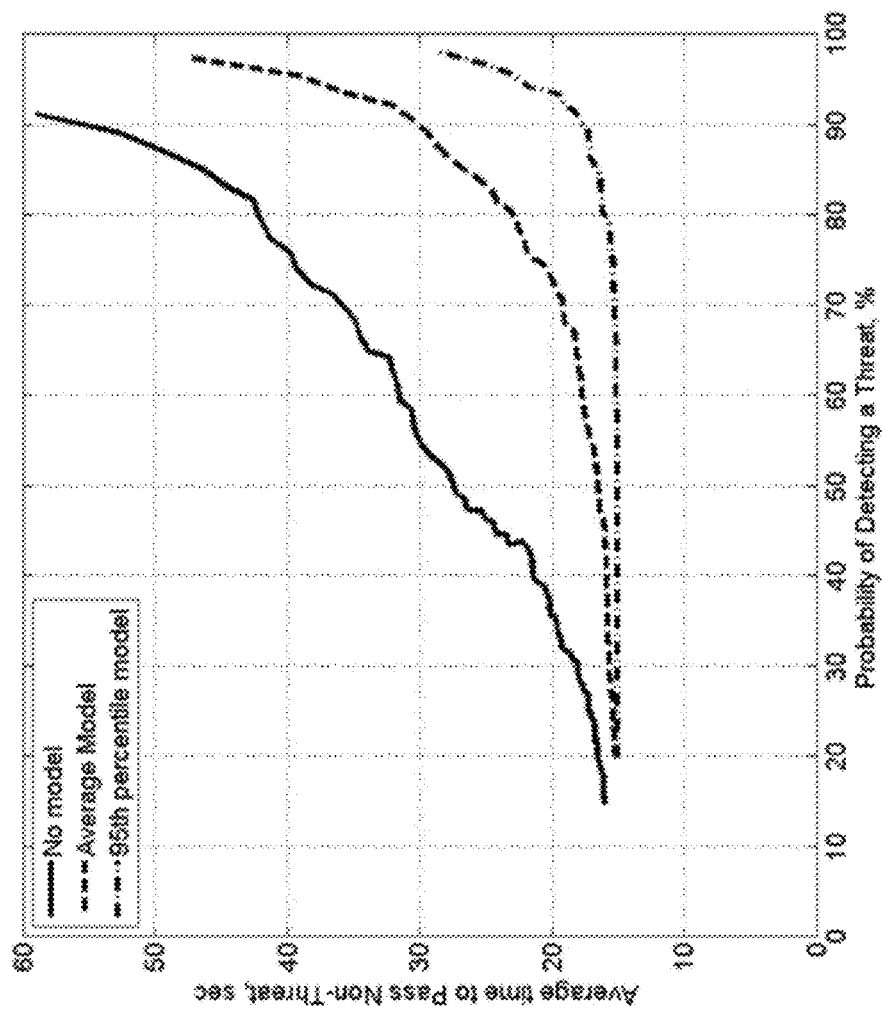

The use of prior knowledge considerably speeds up identification of threat objects. When prior knowledge was not assumed and 50% momentum knowledge was used, 90% detection with zero false positives on the data set used for these receiver operator characteristics (ROC) curves requires ~60 second counting times. When an average of many reconstructions of an empty van for a given time are averaged and subtracted from the cargo scenes the rate of false positives for short scanning times is significantly reduced. A deployed device would have equivalent information about common vehicle models in a data base. Histograms of the maximum reconstructed values obtained using 3 sigma subtraction (the average empty van reconstruction plus 3 times the standard deviation in a set of statistically independent reconstructions for a given scanning time is subtracted voxel by voxel) are shown below in FIG. 11 and ROC curves are shown in FIG. 12. With this procedure the 30 second ROC curve becomes nearly perfect. Plots of the required inspection times are shown in FIG. 13 which compares average inspection times using no prior knowledge (solid line), straight subtraction (dash line) and 3 sigma subtraction (dot-dash line) for the mix of scenes described above.

The dashed curve shows the results that are obtained when the average of many empty van scenes is subtracted from each run before the ROC curve is calculated. This reduces the average level of the signal from the innocuous scenes and results in a factor of two reduction in average scanning time. The dot-dash curve is obtained by subtracting the average signal plus three standard deviations (three sigmas) from the reconstruction at each time. This over subtracts in regions of high density where statistical fluctuations leading to false positives are most likely. This method reduces inspection times by nearly an additional factor of two.

Ambiguity in attribution of scattering signal to appropriate voxel neighborhoods produces consistent effects at discrete exposure times, but is not easily characterized over time. One solution is to develop independent background models for discrete exposure times. Exposure time dependent background models can then be subtracted from a reconstruction being performed on a scene.

For each discrete exposure time, a set of background reconstructions is built based on scans of innocuous scenes. This background set should include as many reconstructions of innocuous scenes as possible, but is effective with as few as 50-100 scanned scenes. Different ways of combining the information from the background dataset can be implemented. Examples include building the background model by averaging each voxel's reconstructed value from each reconstruction in the background dataset, finding the median reconstructed value, and finding the 95th percentile value. The background model can be built based on prior knowledge by either using a modeled reconstruction or using a measured reconstruction of an innocuous scene such as an empty vehicle or container.

To properly combine the results of scans of innocuous scenes into a background model, the position and orientation of the scanned vehicle or container must be known relative to the scanner coordinate system. The precision of this measurement needs to be of the same order as the expected resolution of the muon tracking in the volume of interest, e.g., 1 cm to 2 cm.

Once a background model is developed, the subtraction can be performed in the imaging processing. The value of a voxel in the background model is subtracted from the reconstructed value for that voxel in a considered scene. Calculation of the probability of the presence of a threat proceeds as without background model. Thresholds are applied to the background subtracted scattering densities and the probability of the presence of a threat is calculated from the number of and the degree to which voxels are found over threshold.

Full physics particle transport calculations have been performed on several cargo configurations within a simulated Ford Econoline van. In these calculations, muon scattering datasets were generated based on muon interactions with material in the scene. Scenes included an empty van, the van with several cargoes, and these same scenes with a high density threat object (10 cm cube of tungsten) placed in the scene. Background models were developed based on 100 simulated scans of the empty van for several discrete exposure times. These background models were then applied to 100 reconstructions of each of the other scenes and background corrected ROC curves generated.

Figure 14A:
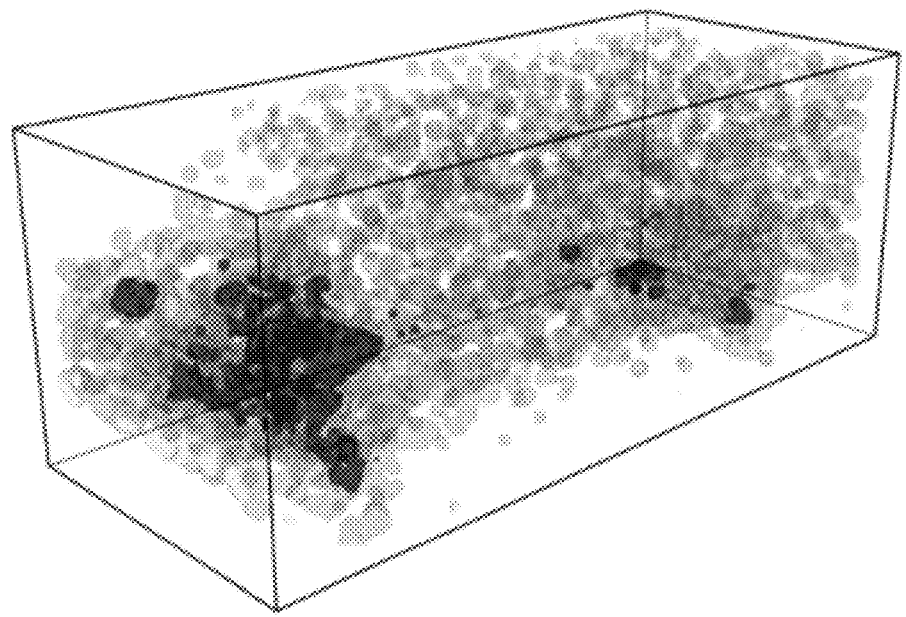
Figure 14B:
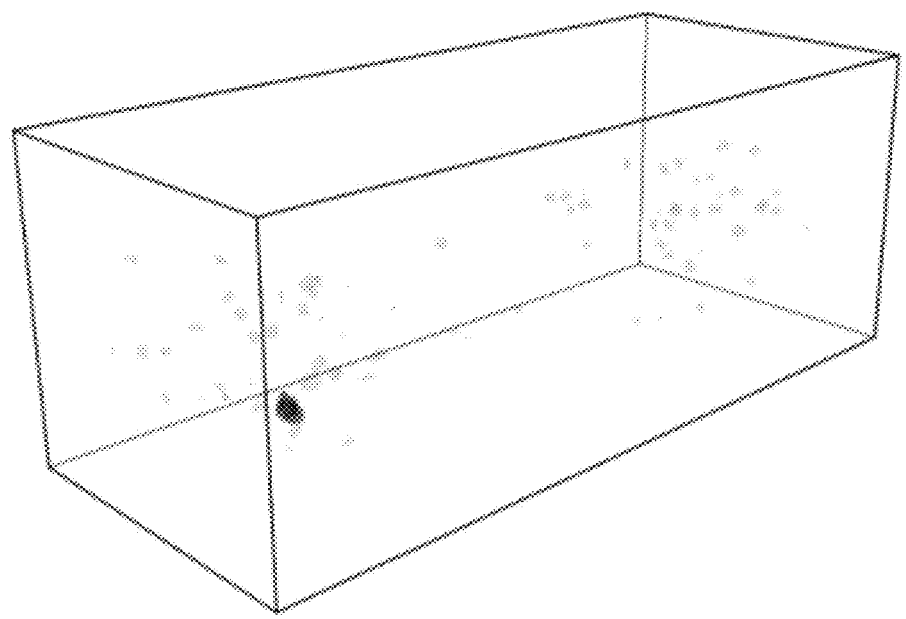

FIGS. 14A and 14B show simulated van exposure with a 10 cm tungsten block under engine before and after background subtraction. The ratio of the threat object signal strength to the background is greatly increased by applying prior knowledge of the vehicle components. The background model in FIG. 14B is based on the 95th percentile background model.

Figure 15A:
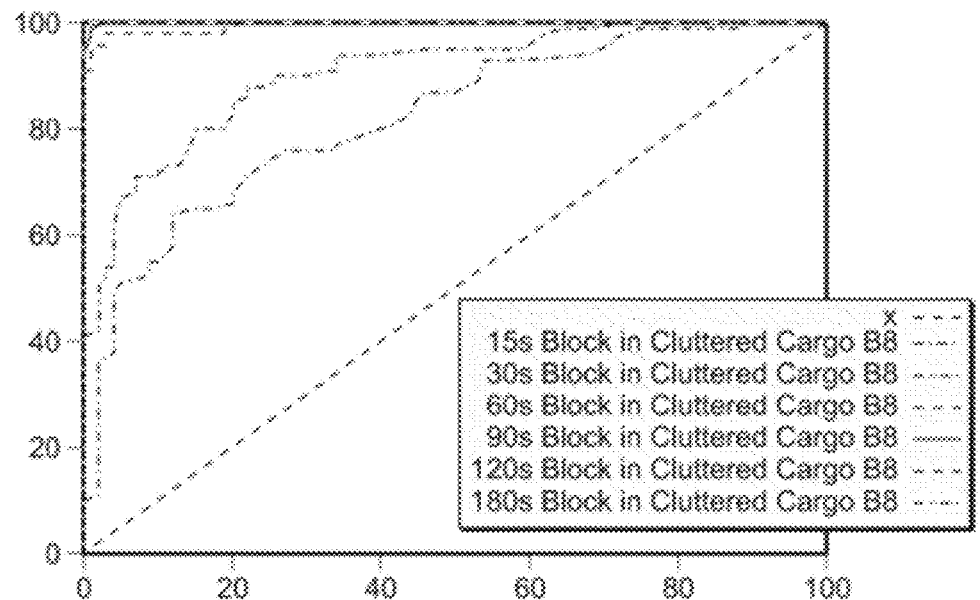
Figure 15B:
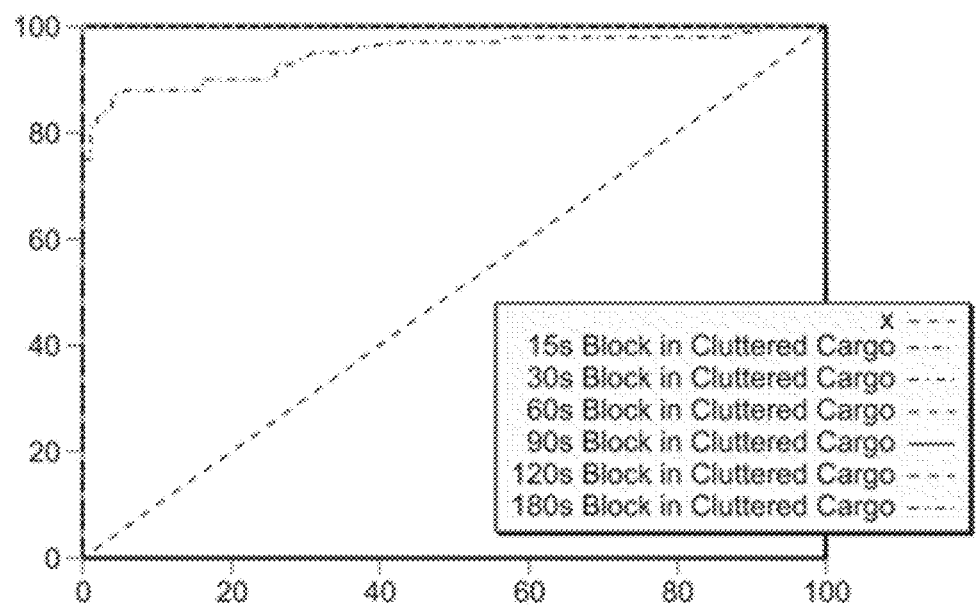

The ROC curves calculated for sets with and without application of the 95th percentile background model are shown in FIGS. 15A and 15B. The simulated exposures were for the van with 10 cm tungsten block hidden in mixed cargo of concrete, steel and aluminum before and after background subtraction. The ROC curves for the background subtracted scenes, even with complicated cargo that is not begin subtracted, show a much higher probability of detection and much lower probability of false alarms at each discrete exposure time.

These ROC curves were analyzed to calculate average exposure times for 95% confidence scanning and these were compared to times calculated without application of background models. Average scan times versus detection probability are plotted in FIG. 13. The calculations were from several hundred simulated scans with various cargos including plywood, concrete and heavy steel equipment. This application of prior knowledge greatly reduces the average scan time for a given probability of detection. For example, the application of the 95th percentile model reduces average scan times for 95% confidence scanning from over a minute to less than 30 seconds.

A study of the efficacy of the use of prior knowledge in a reconstruction was performed using a muon tomography system. In this study, a 6-cylinder car engine was placed in the scanner and a 95th percentile background model developed from 100 1-minute scans. Scans were performed with a 10 kg mass of lead placed on the engine, the model applied and ROC curves developed.

FIGS. 16A, 16B and 16C show an actual muon reconstruction from data taken in a muon tomography system in this study. FIG. 16A shows an example of the muon tomography image of the background for the background model. FIG. 16B shows the muon tomography image of the scene with the lead object. FIG. 16C shows the reconstructed scene after the application of the background model.

Figure 17:
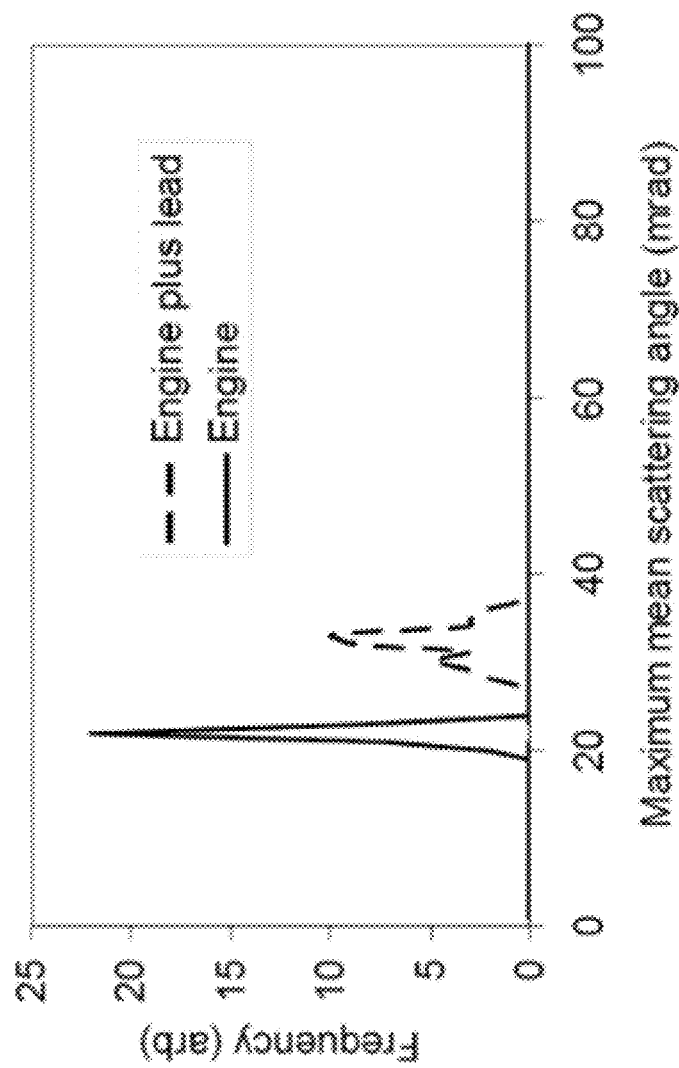
Figure 18:
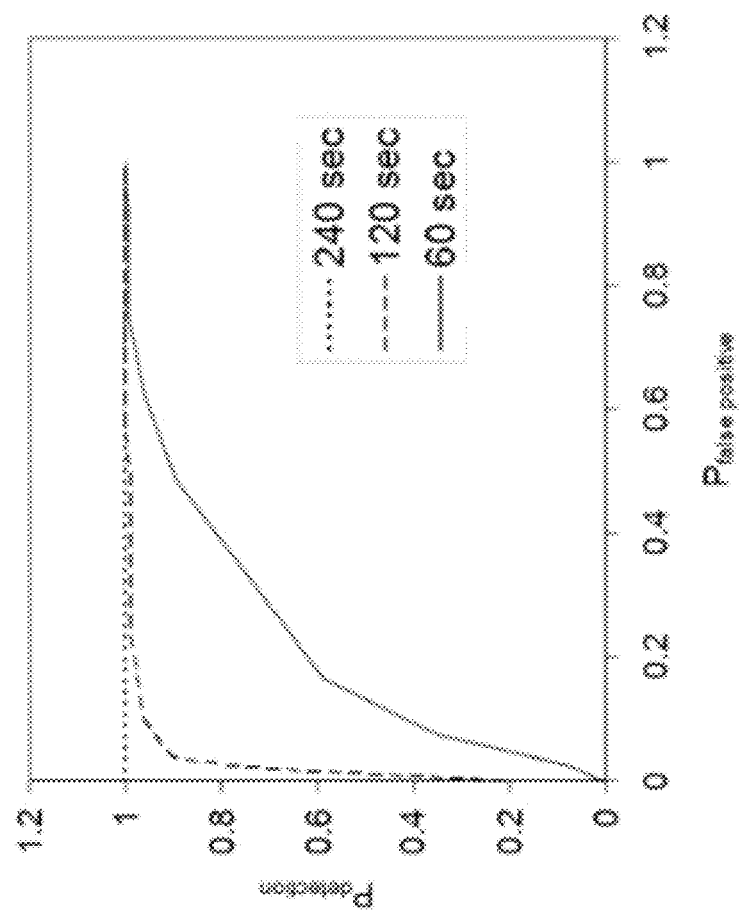

The muon tomography data set was divided into 1, 2, and 4 minute intervals, and analyzed each independently. The average picture from the long run with only the engine was subtracted from each of the individual short runs, and the maximum 10×10×10 cm3 voxel value was histogramed for all of the runs with and without the lead. These histograms, an example is shown in FIG. 17, were used to calculate the ROC curves, shown in FIG. 18.

Average scan times for automatic threat detection with 95% confidence were reduced from an exposure time greater than 10 minutes without prior knowledge of the background component of the scene to a significantly shortened exposure time of less than 4 seconds when the average background model was applied to perform the background subtraction. The application of a model of innocuous background components to three-dimensional re-constructions is shown to greatly reduce the average scan time for clearing scenes of high-Z threat objects, without decreasing the effectiveness of the scanner. The 95th percentile model is effective and its operation effectively accounts for concentration of scattering signal into small regions with short exposure times.

Muon tomography can be used to detect concealed certain materials such as high-Z materials and nuclear materials by detecting the shielding containers that are used to conceal such materials. In addition, muon tomography can detect objects constructed from innocuous materials, such as steel, that have distinctive shapes, such as artillery shells. This detection approach uses shapes of objects present in the muon tomography images to identify certain targeted objects. This shape recognition approach allows the muon tomography imaging to be used in a wide range of detection applications beyond detecting high-Z or medium Z materials.

In addition to tracking pass-through charged particles such as muons and background subtraction disclosed above, a detection system for implementing the disclosed container terminal can also be configured to measure the energy loss of charged particles that pass through a container for determining the contents inside the container. In this regard, a method can be provided for sensing a volume exposed to charged particles to measure the energy loss of charged particles that enter and penetrate the volume or are stopped inside the volume without penetrating through the volume. Based on the measured energy loss, this method can be used to determine a spatial distribution of the charged particles that enter and penetrate the volume or are stopped inside the volume without penetrating through the volume. The method includes using the spatial distribution of the energy loss of the charged particles to reconstruct the three-dimensional distribution of materials in the inspection volume. The method also includes measuring charged particles that enter and penetrate through the volume and those that stop in the volume. The measurements of the energy loss of charged particles are combined with the angular deflection of charged particles to reconstruct the spatial distribution of one or more materials in the volume.

A signal processing unit can determine energy loss of the charged particle beam based on the detected trajectory information. Also, the processing unit can map the radiation dose (e.g., produce an energy loss map) as well as generate an anatomical image.

In addition to the multiple Coulomb scattering induced trajectory changes to charged particles traversing a volume of interest and the stopping of the charged particles inside the volume of interest, energy loss of penetrated charged particles (e.g., muons) can be characterized and used in tomographic reconstruction. Techniques for acquiring energy loss information from a charged particle tracking system are provided below and use this information in a tomographic reconstruction of the materials and their distribution within the volume of interest.

Charged particle tomography generates 3-dimensional pictures using the information contained in the multiple coulomb scattering that occurs as a charged particle passes through matter. As a charged particle traverses matter, it encounters Coulomb forces from each nucleon it passes. The more high atomic number nuclei the charged particle encounters, the more integrated scattering is possible. In addition to the detection of its trajectory, the charged particle loses some fraction of its energy according to its incident energy and the material through which it passes. The energy loss interaction is primarily an effect from the interactions of the particle with electrons in the material, rather than the scattering signal which is dominated by interactions with protons.

Referring to the system in FIG. 3A, in addition to detecting the movement of charged particles in and out of the volume of interest 5, the energy loss of the charged particles traversing the can be detected and analyzed. The charged particles enter the volume of interest 5 and interact with objects present in the trajectories of the charged particles. When the charged particles scatter in response to interacting with the objects, the charged particles lose energy based on the characteristics of the objects.

Figure 19:
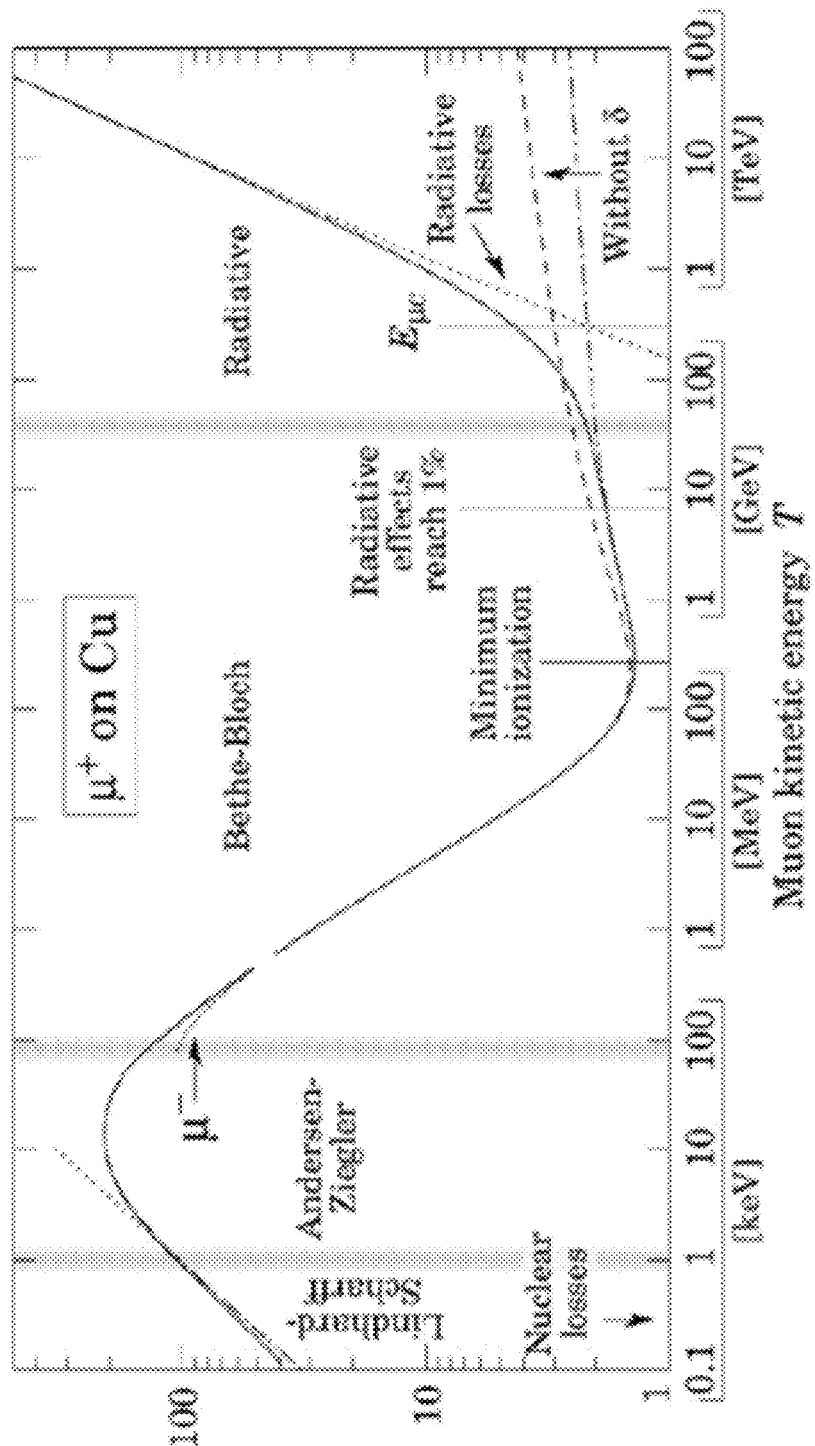
FIG. 19 shows an example of the stopping power for charged particles versus charged particle incident energy.

FIG. 19 shows an example of the stopping power for charged particles versus charged particle incident energy. An example stopping power (=(dE/dx)) is shown for positive muons in copper as a function of kinetic energy T (12 orders of magnitude range).

The energy loss is high for muons with their kinetic energy at or below the rest mass of the muon (non-relativistic muons). Around the mean cosmic-ray muon kinetic energy of 4 GeV, the energy loss is described by Bethe's theory describing primarily ionization and excitation losses with some added corrections. Mean energy loss is approximately 2 MeV cm2/g. Energy loss depends differently on atomic size and charge than multiple Coulomb scattering. Thus, a measurement of the energy loss, when combined with a multiple Coulomb scattering measurement, provides additional information about the materials in a volume of interest.

Figure 20:
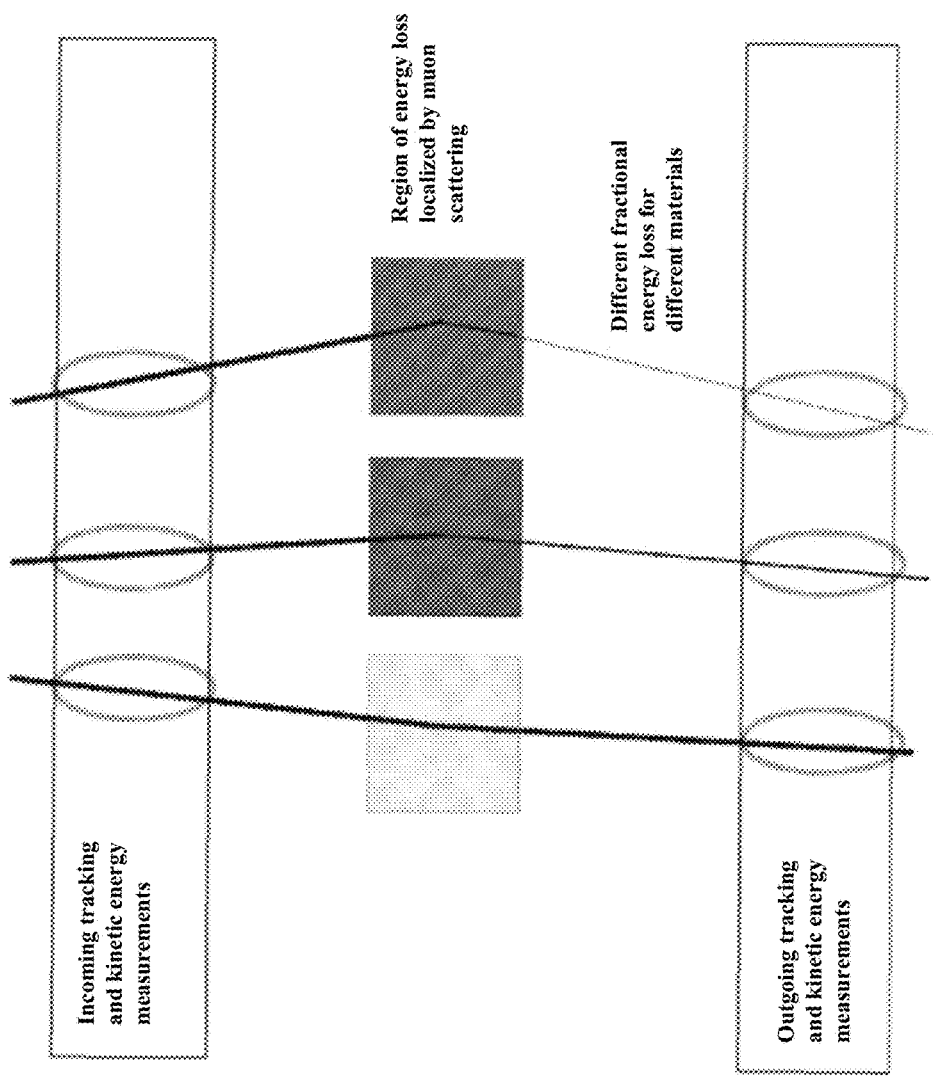
FIG. 20 shows an example illustration of the energy loss measurement in materials and how the measured loss probes properties of the materials in the volume of interest.

FIG. 20 shows an example illustration of the energy loss measurement in materials and how the measured loss probes properties of the materials in the volume of interest. Knowledge of the trajectory of the charged particle provides information on the position and distribution of materials causing the energy loss.

In measuring energy loss in a charged particle tracking detector as those shown in FIGS. 3A, 3B and 4, the momentum of a charged particle can be measured in a tracking detector according to its multiple scattering in the material comprising the detector. By evaluating the degree of agreement between the data produced by a charged particle and a straight line fit, an estimate of the momentum of the particle can be inferred. The momentum measurement can be made independently for the incoming and outgoing trajectories, providing a measurement of the energy lost while traversing the volume of interest.

Reconstruction programs can be implemented to use voxels to define a volume of interest and to incorporate energy loss in tomographic reconstructions. For example, integers nx, ny and nz can be used to define the sides x, y and z of an example rectangular volume. Each voxel includes sides dx, dy and dz with each side represented by a ratio of the side divided by the number n (i.e. dx=x/nx, etc.). Another parameter that can be used in reconstruction is a weighting factor assign to the voxels that result in an image when a 2D or 3D plot of the weighting factor versus the location of the voxels in space is generated.

The weighting factor can be considered as an average density of matter in each voxel. This is based on the weighting factor representing a measure of the average radiation length of matter in each voxel. The radiation length depends on the density and elemental charge of matter and is a measurable constant for each element that can be obtained from simulations of compounds of known elemental composition. Reconstruction algorithms can be implemented to assign weighting factors to the voxels based on the probe of the volume of interest that is being utilized.

For charged muons and electrons, the weighting factors can include scattering, energy loss, stopping, and showering as distinct processes that can be used for imaging of an interrogation volume. Weighting factors are added to voxels that are traversed by the charged particles and the sum of the weighting factors is related to the density or radiation length. Simple routines can be implemented to use the incoming trajectory and any outgoing trajectories of the charged particles that are measured by detectors (e.g., detectors 120 and 130) located on 2 sides of the volume of interest. More complicated routines can be implemented to use dynamic adjustments of the size of the voxels based on the density after the passage of a small sample of the charged particles; and smoothing or clustering based on the density of neighboring voxels.

In charged particle tomography (MT), three-dimensional representations of the scattering density, a measurement of density and atomic number (proton density) of the material in the volume of interest are generated from charged particle scattering data. The fidelity of this reconstruction is determined by the number of charged particles passing through each resolution element (voxel) and the amount of information available from each charged particle. The scattering angle, its location and the distance of closest approach between incoming and outgoing projections of the charged particle trajectory are included in a likelihood function. This function can be maximized according to the scattering data set to reconstruct the material properties and distribution in the volume of interest. Adding the energy loss of the charged particle to the likelihood function provides a related but partially independent measure of the electron density and distribution of materials in the volume of interest.

The update function is defined for each set of charged particles that pass through the volume of interest in a given time. This is considered to be one iteration. Each iteration is then added to a total number until the end of the scan. The update function is dependent on the number of voxels, the measurements that determine one or more weight factors. Each voxel is updated with some value calculated from the charged particles (e.g., muons and/or electrons) passing through the voxel, scattering angles and displacements. The information from showers can be added to this update function in each iteration. This way, all data is considered in the same likelihood calculation instead of calculating each (scattering and showering) separately. Other information that can be considered includes information from stopping and energy loss.

In implementation, the system in FIG. 3A can be used to obtain measured data containing information on penetrated charged particles (e.g., penetrated muons) and stopped charged particles that are trapped inside the volume of interest. Based on such information, the processing unit produces tomographic images of the volume based on different measurements and then produces a final image using one or a combination of at least two tomographic images.

Figure 21:
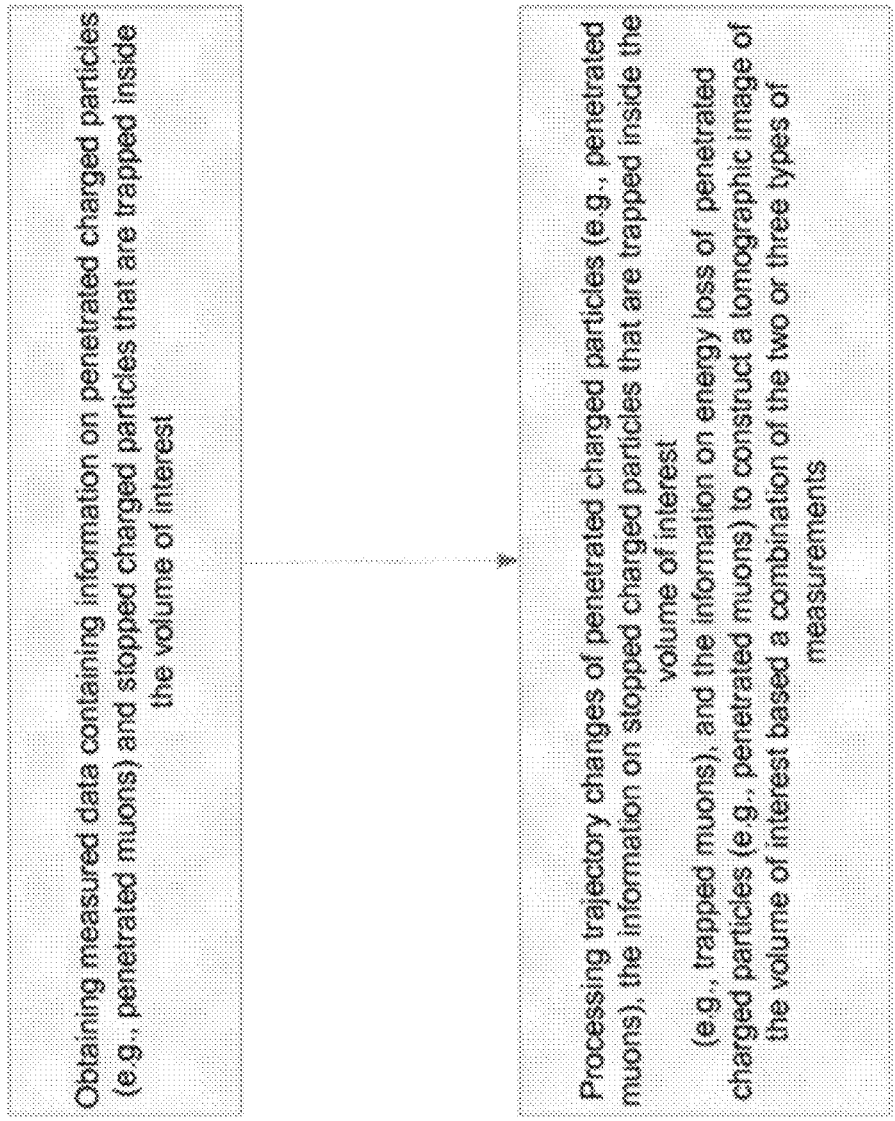
FIG. 21 shows an operation of the system in FIG. 3A based on information measured in both penetrated charged particles and trapped charged particles.

FIG. 21 shows an operation of the system in FIG. 3A based on information measured in both penetrated charged particles and trapped charged particles. Based on the measurements of the penetrated and stopped charged particles, the processing unit combines two or three types of measured data of trajectory changes of penetrated charged particles (e.g., penetrated muons), the information on stopped charged particles that are trapped inside the volume of interest (e.g., trapped muons), and the information on energy loss of penetrated charged particles (e.g., penetrated muons) to construct a tomographic image of the volume of interest. This process uses information of different processes inside the volume of interest to improve the fidelity and resolution of the final image for the volume of interest and to reduce the false detection. In one implementation, three types of measurements can be input into a processing algorithm to construct a single, maximum likelihood material tomographic map of the volume. As such, with the available three types of measurements from the system in FIG. 3A, the generated tomographic image of the volume of interest can be more precise and accurate than the image from any of the measurements alone.

As a further example for using a charged particle scanner to determine the contents inside a container, the charged particles that enter but are stopped inside a container may also be used for enhancing the container imaging operation. In this regard, a process can be implemented in a charged particle scanner for identifying a material of a volume of interest (VOI) exposed to charged particles such as cosmic ray charged particles. The VOI may include, for example, the contents of a container. The exemplary process includes determining a scattering metric of cosmic ray particles interacting with the VOI to represent a first set of cosmic ray particles entering and exiting the VOI. The process includes determining a stopping metric of cosmic ray charged particles interacting with the VOI to represent a second set of cosmic ray charged particles entering and stopping inside the VOI. The process includes computing a ratio of the scattering metric to the stopping metric to obtain a scattering-to-stopping ratio for the VOI. The process includes comparing the determined pair of scattering-to-stopping ratio and the scattering metric against an established scattering-to-stopping-ratio versus the scattering metric relationship for a range of materials to determine whether the material of the VOI matches a material in the range of materials.

Figure 22:
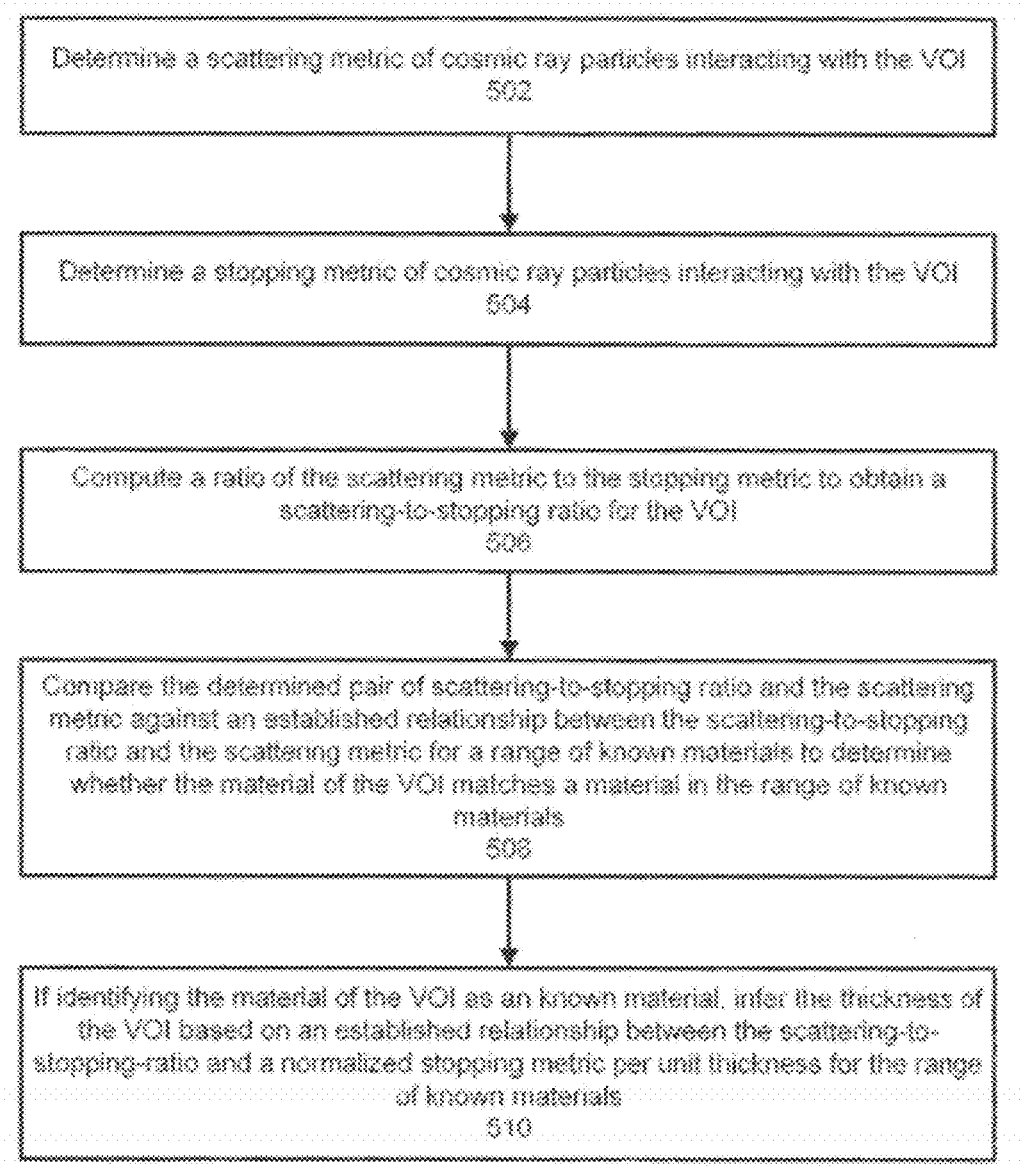
FIG. 22 presents a flowchart illustrating a process of identifying the material of a volume of interest (VOI) exposed to cosmic ray particles in accordance with some embodiments described herein.

FIG. 22 presents a flowchart illustrating an exemplary process of identifying a material or object of a VOI exposed to cosmic ray particles for use in the disclosed container terminal. The material identifying process includes determining a scattering metric of cosmic ray charged particles interacting with the VOI to represent a first set of cosmic ray charged particles entering and exiting the VOI (502). For example, the scattering metric determining process can include using expression (2) to obtain the scattering metric. The material identifying process can include determining a stopping metric of cosmic ray particles interacting with the VOI to represent a second set of cosmic ray charged particles entering and stopping inside the VOI (504). For example, the stopping metric process can include using expression (1) to obtain the scattering metric. The material identifying process can include computing a ratio of the determined scattering metric to the determined stopping metric to obtain a scattering-to-stopping ratio for the VOI (506). The material identifying process includes comparing the determined pair of scattering-to-stopping ratio and the scattering metric against an established relationship between the scattering-to-stopping ratio and the scattering metric for a range of known materials or objects to determine whether the material of the VOI matches a material in the range of known materials (508). When identifying the material of the VOI as an known material, the process can include estimating a thickness of the material or object of VOI based on an established relationship between the scattering-to-stopping-ratio and a normalized stopping metric per unit thickness for the range of known materials (510).

In some embodiments, the stopping power can be computed using the expression:

$$\text{Stopping Power} = [(\text{raw number of stopped tracks/area/time}) \times <p>] / [(\text{number of scattered tracks/area/time}) \times \text{sample thickness}]$$

where $<p>$ is the average momentum of the incident cosmic rays.

In some implementations, the scattering metric is computed using the following expression:

$$\lambda = (<\theta><p>)^2 / [\text{sample thickness}]$$

where $<\theta>$ is the average sample scattering angle. Note that this expression of the scattering metric allows for the elimination of sample thickness as an unknown. This is because the stopping power expression, as shown above, is also normalized by the sample thickness, so that the ratio of the two eliminates the thickness variable. In some embodiments, the ratio of stopping power to scattering enables material identification, and the mean scattering angle can be used to infer the sample thickness.

The material identifying process can include a compensating or mitigating process for the geometric effects of the object being detected to improve the accuracy of the detection. For objects shaped like horizontal planes (e.g., sheets, slabs), substantially all of the cosmic ray produced charged particles traverse the same thickness (or are stopped by the same thickness) as they penetrate the objects. However, objects whose horizontal extent is comparable to or smaller than their vertical thickness can have a substantial number of cosmic ray charged particles with trajectories cutting through corners, and the path lengths of such cosmic ray charged particles can be much shorter than the path lengths of cosmic ray charged particles penetrating the entire thickness of the objects. This effect can skew the observed scattering and stopping power. This skewing, however, can be mitigated by repeating the data reduction, selecting different-sized subsets (i.e., masks) of the VOI for analysis. A mask much smaller than the full horizontal extend of an object will include a smaller fraction of cosmic ray charged particle trajectories cutting the corners, and thus have smaller systematic error. Varying the mask size can quantify the error, as well as yielding better estimates of both thickness and horizontal dimensions.

In implementations, a method can be used for characterizing a range of materials based on scattering and stopping of incident cosmic ray charged particles passing through each material. The exemplary method comprises for a given material within the range of materials: (a) creating a volume of interest (VOI) of the material, (b) determining a scattering metric of cosmic ray charged particles interacting with the VOI to represent a first set of cosmic ray charged particles entering and exiting the VOI, (c) determining a stopping metric of cosmic ray charged particles interacting with the VOI to represent a second set of cosmic ray charged particles entering and stopping inside the VOI, and (d) computing a ratio of the scattering metric to the stopping metric to obtain a scattering-to-stopping ratio for the material. The method also includes establishing a scattering-stopping relationship of cosmic ray particles for the range of materials based on the determined pairs of the scattering-to-stopping ratio and the associated scattering metric for the range of materials.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or a variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Only a few implementations are disclosed. Variations and enhancements of the described implementations and other implementations can be made based on what is described and illustrated in this document.

What is claimed is:

1. A method for scanning containers as part of processing inbound containers from a ship in a container terminal of a port, the method comprising:
off-loading containers from a ship onto one end of a yard stack closest to the ship;
obtaining information on each container including container identification number and container manifest;
prior to placing a container in the yard stack for ground shipping, operating a container scanner at the one end of the yard stack closest to the ship to scan the container to obtain information on the scanned container to indicate whether the container contains one or more suspect regions or objects,
wherein the container scanner includes a charged particle tomography scanner operated based on muons from cosmic rays, and
wherein the operating of the container scanner to scan the container comprises:
determining a scattering metric of cosmic ray particles interacting with contents of the container to represent a first set of cosmic ray particles entering and exiting the contents of the container;
determining a stopping metric of cosmic ray charged particles interacting with the contents of the container to represent a second set of cosmic ray charged particles entering and stopping inside the contents of the container;
computing a ratio of the scattering metric to the stopping metric to obtain a scattering-to-stopping ratio for the content of the container; and
comparing the determined pair of scattering-to-stopping ratio and the scattering metric against an established scattering-to-stopping-ratio versus the scattering metric relationship for a range of materials to determine whether the contents of the container matches a material in the range of materials;
upon finishing the scanning, placing the scanned container in the yard stack for storage for subsequent ground shipping or onto a truck or train for immediate ground shipping; and
providing information of the scanned container for clearance for ground shipping, wherein the provided information includes the container identification number, the container manifest, and information of the scanning indicating whether the scanned container contains one or more suspect regions or objects.

2. The method as in claim 1, wherein the obtaining of information on each container is performed while the containers are off-loaded from the ship onto one end of the yard stack.

3. The method as in claim 1, wherein:
the container scanner at the end of the yard stack closest to the ship scans one container at a time.

4. The method as in claim 1, wherein:
the container scanner at the end of the yard stack closest to the ship scans two or more containers in parallel at a time.

5. The method as in claim 1, wherein:
operating the container scanner at the end of the yard stack closest to the ship includes scanning a container during a time between two adjacent pickups by a yard crane handling containers at the yard stack to avoid adding time for scanning the container.

6. The method as in claim 1, wherein the charged particle tomography scanner includes drift tubes to detect incoming and outgoing cosmic-ray produced charged particles and gamma rays.

7. The method as in claim 6, further comprising:
operating a gamma ray source to provide a detectable increase in gamma ray counting rate.

8. The method as in claim 6, further comprising:
detecting, using drift tubes, neutrons emitted from the container, wherein the drift tubes include a neutron sensitive material.

9. The method as in claim 1, wherein operating the container scanner to scan the container comprises:
obtaining one or more cosmic muon images of the container under inspection;
subtracting a reference cosmic muon image of a reference container that represents a background of the container under inspection from an obtained cosmic muon image of the container under inspection to obtain a subtracted image; and
processing the subtracted image to determine whether the container under inspection contains a target object that is absent from the reference cosmic muon image.

10. The method as in claim 1, wherein operating the container scanner to scan the container comprises:
measuring energy loss of charged particles that enter and penetrate a volume and charged particles that are stopped inside the volume without penetrating through the volume; and
determining, based on the measured energy loss, a spatial distribution of the charged particles that enter and penetrate a volume and charged particles that are stopped inside the volume without penetrating through the volume.

11. A method to enable scanning of shipping containers transiting a port for threat material or contraband material without slowing down the flow of containers through the port, from ship to exit by land or onto a ship in the case of transshipment, the method comprising:
shuttling a container arriving on an automated guided vehicle (AGV) from a ship into at least one scanning system, wherein the at least one scanning system is located at an end of a yard stack of containers nearest a dock, wherein the at least one scanning system includes a charged particle tomography scanner operated based on muons from cosmic rays;
receiving a container identification and, if available, a container manifest;
scanning the container to analyze the container's contents for the presence of threat material or contraband material, wherein the scanning of the container comprises:
determining a scattering metric of cosmic ray particles interacting with contents of the container to represent a first set of cosmic ray particles entering and exiting the contents of the container;
determining a stopping metric of cosmic ray charged particles interacting with the contents of the container to represent a second set of cosmic ray charged particles entering and stopping inside the contents of the container;
computing a ratio of the scattering metric to the stopping metric to obtain a scattering-to-stopping ratio for the content of the container; and
comparing the determined pair of scattering-to-stopping ratio and the scattering metric against an established scattering-to-stopping-ratio versus the scattering metric relationship for a range of materials to determine whether the contents of the container matches a material in the range of materials;

sending an integrated data package to an offsite customs or security facility; and shuttling the container out of the scanning system for pickup by a yard crane, wherein the integrated data package includes: (a) the container identification, (b) the container manifest, (c) raw data related to the contents of the container or processed images of the contents of the container; (d) assessment of the contents of the container in terms of a presence of potential threat material or contraband materials, or (e) a clear signal or alert signal upon which customs or security can act.

12. The method of claim 11, wherein the scanning system is configured to accept a plurality of containers side by side and concurrently, up to the number of container rows in the yard stack serviced by the scanning system, and the scanning system accepts a full forty foot long container for imaging in a single scan.

13. The method of claim 12, wherein the scanning system scans adjacent containers for different lengths of time, and wherein each container is shuttled into and out of the scanner independently.

14. The method of claim 13, wherein the scanning of adjacent containers for different lengths of time depends on any one or more of container contents, image quality, and detection confidence level.

15. The method of claim 13, wherein the scanning system is configured to scan a container of twenty foot length in a single scan, and wherein the scanning system scans a container of forty foot length in two end-to-end scans.

16. The method of claim 15, wherein data from the end-to-end scans is combined to produce a single reconstruction of the contents of the container.

17. The method of claim 11, wherein the scanning system is configured to accept a single container at one time.

18. The method of claim 13, wherein scanning systems are installed at the end of every yard stack in the port.

19. The method of claim 11, wherein the processed images include three-dimensional images.

20. The method as in claim 11, wherein the charged particle tomography scanner detects incoming and outgoing cosmic-ray produced charged particles and gamma rays.

21. The method as in claim 20, further comprising:

operating a gamma ray source to provide a detectable increase in gamma ray counting rate.

22. The method of claim 11, further comprising:

detecting, using drift tubes, neutrons emitted from the container, wherein the drift tubes include a neutron sensitive material.

23. The method as in claim 11, wherein the scanning of the container comprises:

obtaining one or more cosmic muon images of the container under inspection;

subtracting a reference cosmic muon image of a reference container that represents a background of the container under inspection from an obtained cosmic muon image of the container under inspection to obtain a subtracted image; and processing the subtracted image to determine whether the container under inspection contains a target object that is absent from the reference cosmic muon image.

24. The method as in claim 11, wherein the scanning of the container comprises:

measuring energy loss of charged particles that enter and penetrate a volume and charged particles that are stopped inside the volume without penetrating through the volume; and determining, based on the measured energy loss, a spatial distribution of the charged particles that enter and penetrate a volume and charged particles that are stopped inside the volume without penetrating through the volume.

25. A method to enable scanning of shipping containers transiting a port for threat material or contraband material without slowing down the flow of containers through the port, from ship to exit by land or onto a ship in the case of transshipment, the method comprising:

shuttling a container arriving on an automated guided vehicle (AGV) from a ship into at least one scanning system, wherein the at least one scanning system is located at an end of a yard stack of containers nearest a dock;

receiving a container identification and, if available, a container manifest;

scanning the container to analyze the container's contents for the presence of threat material or contraband material;

sending an integrated data package to an offsite customs or security facility; and shuttling the container out of the scanning system for pickup by a yard crane, wherein the integrated data package includes: (a) the container identification, (b) the container manifest, (c) raw data related to the contents of the container or processed images of the contents of the container; (d) assessment of the contents of the container in terms of a presence of potential threat material or contraband materials, or (e) a clear signal or alert signal upon which customs or security can act, wherein only container identification and container manifest are shared with the port, and scanning results are shared only with the offsite customs or security facility.

26. The method as in claim 25, wherein the at least one scanning system includes a charged particle tomography scanner operated based on muons from cosmic rays.

27. The method of claim 25, wherein the scanning system is configured to accept a plurality of containers side by side and concurrently, up to the number of container rows in the yard stack serviced by the scanning system, and the scanning system accepts a full forty foot long container for imaging in a single scan.

28. The method of claim 27, wherein the scanning system scans adjacent containers for different lengths of time, and wherein each container is shuttled into and out of the scanner independently.

29. The method of claim 28, wherein the scanning of adjacent containers for different lengths of time depends on any one or more of container contents, image quality, and detection confidence level.

30. The method of claim 28, wherein the scanning system is configured to scan a container of twenty foot length in a single scan, and wherein the scanning system scans a container of forty foot length in two end-to-end scans.

31. The method of claim 30, wherein data from the end-to-end scans is combined to produce a single reconstruction of the contents of the container.

32. The method of claim 25, wherein the scanning system is configured to accept a single container at one time.

33. The method of claim 28, wherein scanning systems are installed at the end of every yard stack in the port.

34. The method of claim 25, wherein the processed images include three-dimensional images.

35. The method as in claim 26, wherein the charged particle tomography scanner detects incoming and outgoing cosmic-ray produced charged particles and gamma rays.

36. The method as in claim 35, further comprising:
    operating a gamma ray source to provide a detectable increase in gamma ray counting rate.

37. The method as in claim 26, further comprising:
    detecting, using drift tubes, neutrons emitted from the container, wherein the drift tubes include a neutron sensitive material.

38. The method as in claim 26, wherein the scanning of the container comprises:
    obtaining one or more cosmic muon images of the container under inspection;
    subtracting a reference cosmic muon image of a reference container that represents a background of the container under inspection from an obtained cosmic muon image of the container under inspection to obtain a subtracted image; and
    processing the subtracted image to determine whether the container under inspection contains a target object that is absent from the reference cosmic muon image.

39. The method as in claim 26, wherein the scanning of the container comprises:
    measuring energy loss of charged particles that enter and penetrate a volume and charged particles that are stopped inside the volume without penetrating through the volume; and
    determining, based on the measured energy loss, a spatial distribution of the charged particles that enter and penetrate a volume and charged particles that are stopped inside the volume without penetrating through the volume.

40. The method as in claim 26, wherein the scanning of the container comprises:
    determining a scattering metric of cosmic ray particles interacting with contents of the container to represent a first set of cosmic ray particles entering and exiting the contents of the container;
    determining a stopping metric of cosmic ray charged particles interacting with the contents of the container to represent a second set of cosmic ray charged particles entering and stopping inside the contents of the container;
    computing a ratio of the scattering metric to the stopping metric to obtain a scattering-to stopping ratio for the content of the container; and
    comparing the determined pair of scattering-to-stopping ratio and the scattering metric against an established scattering-to-stopping-ratio versus the scattering metric relationship for a range of materials to determine whether the contents of the container matches a material in the range of materials.

41. A container terminal for performing container scanning as part of processing inbound containers from a ship at a port, comprising:
    a docking area including ship cranes operable to off load containers from a ship;
    a stacking yard including yard stacks in designated stacking locations, each yard stack including a first end closest to the ship and at least one yard crane for receiving containers from the ship, at least one yard crane for handling containers that are dropped off at the first end and a second end farthest from the ship for sending containers for ground transportation;
    container scanners distributed to the yard stacks, each container scanner located at the first end of each yard stack closest to the ship, each container scanner configured to scan each container dropped off at the yard stack prior to placing scanned containers in another portion of the yard stack for ground shipping, each container scanner configured to obtain information on the scanned container indicating whether the container contains one or more suspect regions or objects, and each container scanner includes a charged particle tomography scanner operated based on muons from cosmic rays; and
    a signal processing unit communicably coupled to container scanners, wherein the signal processing unit comprises a memory configured to store data and instructions, and at least one processor, wherein the instructions, when executed cause the at least one processor to:
        determine a scattering metric of cosmic ray particles interacting with contents of the container to represent a first set of cosmic ray particles entering and exiting the contents of the container;
        determine a stopping metric of cosmic ray charged particles interacting with the contents of the container to represent a second set of cosmic ray charged particles entering and stopping inside the contents of the container;
        compute a ratio of the scattering metric to the stopping metric to obtain a scattering-to-stopping ratio for the content of the container;
        compare the determined pair of scattering-to-stopping ratio and the scattering metric against an established scattering-to-stopping-ratio versus the scattering metric relationship for a range of materials to determine whether the contents of the container matches a material in the range of materials; and
        provide information for each scanned container for clearance for ground shipping, wherein the provided information includes an identification number, the container manifest, and information of the scanning indicating whether the scanned container contains one or more suspect regions or objects.

42. The container terminal as in claim 41, wherein charged particle tomography scanner includes drift tubes, wherein the signal processing unit is communicably coupled to the drift tubes, and wherein the instructions, when executed cause the at least one processor to:
    detect incoming and outgoing cosmic-ray produced charged particles and gamma rays.

43. The container terminal as in claim 42, further comprising:
    a gamma ray source communicably coupled to the signal processing unit, wherein the instructions, when executed cause the at least one processor to:
        provide a detectable increase in gamma ray counting rate.

44. The container terminal as in claim 42, wherein the drift tubes include a neutron sensitive material to detect neutrons emitted from the container.

45. The container terminal as in claim 41, wherein the signal processing unit is communicably coupled to the charged particle tomography scanner, and wherein the instructions, when executed cause the at least one processor to:

obtain one or more cosmic muon images of the container under inspection;
   subtract a reference cosmic muon image of a reference container that represents a background of the container under inspection from an obtained cosmic muon image of the container under inspection to obtain a subtracted image; and
   process the subtracted image to determine whether the container under inspection contains a target object that is absent from the reference cosmic muon image.

46. The container terminal as in claim 41, wherein the signal processing unit is communicably coupled to the charged particle tomography scanner, and wherein the instructions, when executed cause the at least one processor to:

measure energy loss of charged particles that enter and penetrate a volume and charged particles that are stopped inside the volume without penetrating through the volume; and
   determine, based on the measured energy loss, a spatial distribution of the charged particles that enter and penetrate a volume and charged particles that are stopped inside the volume without penetrating through the volume.

* * * * *